(12) United States Patent
Yamaga et al.

(10) Patent No.: US 12,367,904 B2
(45) Date of Patent: Jul. 22, 2025

(54) MAGNETIC RECORDING MEDIUM

(71) Applicant: Sony Group Corporation, Tokyo (JP)

(72) Inventors: Minoru Yamaga, Tokyo (JP); Futoshi Sasaki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/284,420

(22) PCT Filed: Feb. 8, 2022

(86) PCT No.: PCT/JP2022/004840
§ 371 (c)(1),
(2) Date: Sep. 27, 2023

(87) PCT Pub. No.: WO2022/209316
PCT Pub. Date: Oct. 6, 2022

(65) Prior Publication Data
US 2024/0170013 A1    May 23, 2024

(30) Foreign Application Priority Data
Mar. 31, 2021   (JP) .................. 2021-059110

(51) Int. Cl.
*G11B 5/706* (2006.01)
*G11B 5/714* (2006.01)
*G11B 5/78* (2006.01)

(52) U.S. Cl.
CPC .......... *G11B 5/70626* (2013.01); *G11B 5/714* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 5,718,964 A | 2/1998 | Naoe et al. | |
| 2005/0079389 A1* | 4/2005 | Ichikawa | G11B 5/7325 |
| | | | 428/844 |

(Continued)

FOREIGN PATENT DOCUMENTS

| | | |
|---|---|---|
| JP | H09128739 A | 5/1997 |
| JP | 2017068884 A | 4/2017 |

(Continued)

OTHER PUBLICATIONS

English Abstract of JP 2017-168178 A (Year: 2017).*

(Continued)

*Primary Examiner* — Kevin M Bernatz
(74) *Attorney, Agent, or Firm* — K&L Gates LLP

(57) ABSTRACT

A magnetic recording medium is provided and including a magnetic layer containing magnetic powders, in which, the magnetic layer contains first particles having conductivity and second particles of which Mohs hardness is 7 or more, protrusions are formed on a surface of the magnetic layer side in accordance with the first particles and the second particles, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of the protrusions formed in accordance with the second particles is 7 nm or less.

9 Claims, 24 Drawing Sheets

(56) References Cited

U.S. PATENT DOCUMENTS

| | | | |
|---|---|---|---|
| 2010/0246073 A1* | 9/2010 | Katayama | G11B 5/7085 360/324 |
| 2014/0287271 A1* | 9/2014 | Sato | G11B 5/7013 428/844 |
| 2016/0093323 A1* | 3/2016 | Omura | G11B 5/71 428/840.2 |
| 2017/0092314 A1 | 3/2017 | Mori | |
| 2017/0278533 A1* | 9/2017 | Kasada | G11B 5/78 |
| 2021/0125634 A1 | 4/2021 | Yamaga et al. | |
| 2021/0233564 A1* | 7/2021 | Kasada | G11B 5/702 |
| 2022/0270644 A1* | 8/2022 | Kurokawa | G11B 5/70678 |
| 2024/0177733 A1* | 5/2024 | Kasada | G11B 5/73 |
| 2024/0290349 A1* | 8/2024 | Yamaga | G11B 5/727 |
| 2024/0331727 A1* | 10/2024 | Sekiguchi | G11B 5/706 |

FOREIGN PATENT DOCUMENTS

| | | | |
|---|---|---|---|
| JP | 2017168178 A | * | 9/2017 |
| WO | 2019159465 A1 | | 8/2019 |

OTHER PUBLICATIONS

Machine Translation of JP 2017-168178 A (Year: 2017).*
International Search Report from corresponding PCT application PCT/JP2022/004840, dated Apr. 26, 2022.

* cited by examiner

MAGNETIC RECORDING MEDIUM

TECHNICAL FIELD

The present technology relates to a magnetic recording medium.

BACKGROUND ART

For example, in accompaniment with development of the IoT, big data, artificial intelligence, and the like, the amount of data that is collected and stored has significantly increased. As a medium for recording a large amount of data, a magnetic recording medium is frequently used.

Regarding magnetic recording media, various technologies have been proposed until now. For example, as a technology relating to improvement of running safety, in the following PTL 1, a magnetic recording tape that is a tape having a multi-layer structure including at least a magnetic layer in which a whole thickness of this tape is 5.6 µm or less, a plurality of concave parts are disposed on the surface of the magnetic layer described above, a value acquired by dividing a depth D1 of the concave part described above by a thickness D2 of the magnetic layer described above is 15% or more, the magnetic layer described above has a vertical orientation, and has a degree of vertical orientation under a condition with no correction of a diamagnetic field of 65% or more, a plurality of concave parts that are 20% or more of the thickness of the magnetic layer are formed in the magnetic layer described above, and the number of the concave parts is 55 or more per surface area of 6,400 µm² of the magnetic layer is disclosed.

CITATION LIST

Patent Literature

[PTL 1]
WO 2019/159465

SUMMARY

Technical Problem

In recent years, for the use as an archive in a data center, a magnetic tape (a magnetic recording medium) has been used. In accordance with this, the requirements for high reliability of a magnetic tape have been increased. Particularly, it is important that a magnetic tape can stably run even in a case in which the magnetic tape has run several times.

In addition, while the width of data tracks is becoming narrower as the capacity of magnetic tapes increases, it is not desirable for errors in reading a servo signal to occur. In accordance with running of a magnetic tape several times, a rise in a frictional force of the magnetic tape also has a likelihood of causing error in reading a servo signal, which is not desirable in magnetic recording.

In addition, in a case in which the frictional force of a magnetic tape is high, there are also cases in which a stick slip phenomenon occurs. The occurrent of this phenomenon may bring about occurrence of a running speed deviation of the magnetic tape. In addition, in accordance with a high frictional force, when a magnetic head is moved in a horizontal direction for correcting a servo position, the tape is also moved, which may lead to being unable to immediately correct the servo position.

Furthermore, for example, in order to clean off deposits adhering to a magnetic head, it is also important to maintain a polishing force of the magnetic tape. In accordance with running of the magnetic tape several times, a reduction of a polishing force of the magnetic tape for the magnetic head may occur as well.

In order to prevent an increase in a frictional force at the time of running of a magnetic tape, for example, using a solid lubricant component (for example, carbon particles or the like having an action as a solid lubricant) may be considered. In addition, for magnetic head cleaning, using a component having a polishing effect (in addition, an anchoring effect) (for example, particles having a high Mohs hardness, particularly, alumina or the like) may be considered. Inclusion of a combination of these two components in a magnetic tape (for example, a magnetic layer) may be conceived in order to prevent a rise in the frictional force and perform cleaning of the magnetic head.

A main object of the present technology is to provide a magnetic recording medium having a high recording density capable of preventing a rise in a frictional force also in a case in which it has run several times. In addition, a novel object of the present technology is to maintain a polishing force at the time of running several times in addition to the prevention of a rise in a frictional force.

Solution to Problem

The present technology provides a magnetic recording medium including a magnetic layer containing magnetic powders, in which, the magnetic layer contains first particles having conductivity and second particles of which a Mohs hardness is 7 or more, protrusions are formed on a surface of the magnetic layer side in accordance with the first particles and the second particles, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of the protrusions formed in accordance with the second particles is 7 nm or less.

The second particles described above may be inorganic particles.

The second particles described above may be alumina particles.

The shape of the magnetic powders described above may be one of a plate shape, a sphere shape, and a square shape.

The number of the protrusions formed in accordance with the second particles described above on the surface of the magnetic layer side described above may be two or more per unit area ($\mu m^2$).

A ratio of the second particles forming protrusions having protrusion heights of 10 nm or more to the second particles forming protrusions having protrusion heights of 4 nm or more on the surface of the magnetic layer side described above may be 20% or less.

The number of the protrusions formed in accordance with the first particles on the surface of the magnetic layer side described above may be 0.3 or more and 1.9 or less per unit area ($\mu m^2$).

A ratio of the first particles forming protrusions having protrusion heights of 10 nm or more to the first particles forming protrusions having protrusion heights of 4 nm or more on the surface of the magnetic layer side described above may be 60% or less.

An average thickness (an average total thickness) may be 5.7 µm or less.

An average thickness of the magnetic layer is 0.08 μm or less.

Abrasivity of an AlTiC rectangular prism may satisfy the following relational expression.

12.5≤Abrasivity≤20

The present technology provides a magnetic recording medium including a magnetic layer containing magnetic powders, in which, the magnetic layer contains first particles having conductivity and second particles of which Mohs hardness is 7 or more, protrusions are formed on a surface of the magnetic layer side in accordance with the first particles and the second particles, a ratio ($H_1/H_2$) of an average height ($H_1$) of protrusions formed in accordance with the first particles to an average height ($H_2$) of protrusions formed in accordance with the second particles is 2.3 or less, and the average height ($H_1$) of the protrusions formed in accordance with the first particles is 12 nm or less.

The present technology provides a magnetic recording cartridge in which the magnetic recording medium described above is wound around a reel.

DESCRIPTION OF EMBODIMENTS

Figure 1:
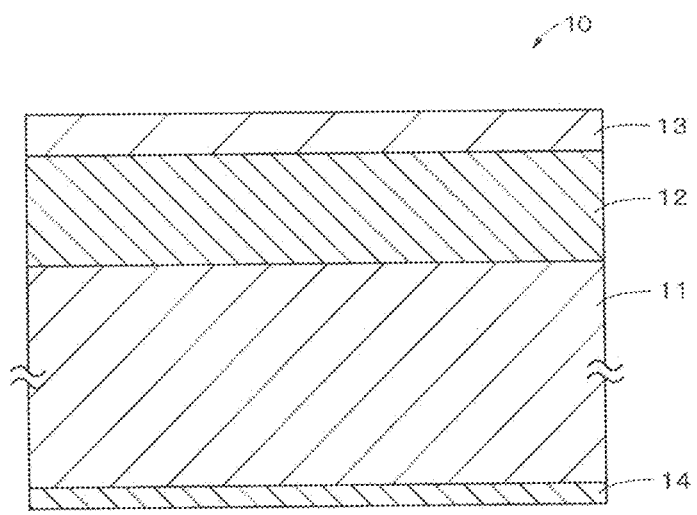
FIG. 1 is a cross-sectional view illustrating a configuration of a magnetic recording medium according to a first embodiment.

Hereinafter, suitable embodiments for implementing the present technology will be described. Embodiments to be described below show typical embodiments of the present technology, and the scope of the present technology is not limited to these embodiments.

The present technology will be described in the following order.

1. Description of present technology
2. First Embodiment
  (1) Configuration of magnetic recording medium
  (2) Description of each layer
  (3) Physical properties and structure
  (4) Method for manufacturing magnetic recording medium
  (5) Recording and reproducing device
  (6) Modified example
3. Second embodiment (cartridge)
  (1) One embodiment of magnetic recording cartridge
  (2) Modified example of magnetic recording cartridge
4. Examples In this specification, unless a measurement environment is particularly described in description of a measurement method, the measurement is assumed to be performed under an environment of 25° C.±2° C., 50% RH±5% RH.

1. Description of Present Technology

The inventors and the like of the present technology have discovered that a rise in a frictional force can be prevented by adjusting heights of protrusions formed using first particles to be described below and heights of protrusions formed using second particles. In addition, the inventors and the like of the present technology have discovered that a polishing force can be maintained. For example, the first particle described above may be a particle having an effect of a solid lubricant and having conductivity. The second particle described above may be a particle having a high Mohs hardness, and, in accordance with this, a polishing effect and an anchoring effect may be caused, and a magnetic head cleaning effect may be caused. In addition, in order to obtain the effects of the present technology, it is preferable to adjust the number of protrusions and a composition ratio of the protrusions in addition to heights of the protrusions.

In other words, a magnetic recording medium according to the present technology includes a magnetic layer including magnetic powder, and the magnetic layer described above contains first particles having conductivity and second particles of which a Mohs hardness is 7 or more. The first particles described above have conductivity and may have a function as a solid lubricant. The second particles have a Mohs hardness that is 7 or more and is preferably 9 or more and may have a polishing effect and an anchoring effect. In accordance with the first particles described above and the second particles described above, protrusions are formed on a surface of the above-described magnetic layer side, and a ratio ($H_1/H_2$) of an average height ($H_1$) of protrusions formed using the first particles described above to an average height ($H_2$) of protrusions formed using the second particles described above is 2.3 or less, preferably 2.1 or less, more preferably 1.9 or less, further more preferably 1.7 or less, and yet further more preferably 1.6 or less. In accordance with the magnetic recording medium described above having a ratio ($H_1/H_2$) of average heights of protrusions in the numerical range described above, the number of occurrences of a rise in friction according to several times of running is small, and this contributes to being able to appropriately maintain a polishing force for a head. A method for measuring the average height ($H_1$) of protrusions of the first particles described above and the average height ($H_2$) of protrusions of the second particles described above will be described below in 2.(3).

In addition, although a lower limit of the ratio ($H_1/H_2$) of average heights of the protrusions described above is not particularly limited, for example, it may be 1.0 or more, preferably, 1.1 or more and, more preferably, 1.2 or more.

In the magnetic recording medium according to the present technology, the average height ($H_1$) of protrusions formed using the first particles described above may be 12 nm or less, preferably 11.5 nm or less, more preferably 10.5 nm or less, further more preferably 9.5 nm or less, and yet further more preferably 8.5 nm or less. In accordance with the magnetic recording medium described above having an average height ($H_1$) of protrusions formed using the first particles in the numerical range described above, the number of occurrences of a rise in friction according to several times of running is small, and this contributes to being able to appropriately maintain a polishing force for a head.

In addition, although a lower limit of the average height ($H_1$) of protrusions formed using the first particles described above is not particularly limited, for example, it is preferably 5.0 nm or more, more preferably 5.5 nm or more, and further more preferably 6.0 nm or more.

In the magnetic recording medium according to the present technology, the average height ($H_2$) of protrusions formed using the second particles described above may be 7 nm or less, preferably 6.5 nm or less, more preferably 6.0 nm or less, further more preferably 5.5 nm or less, and yet further more preferably 5.3 nm or less. In accordance with the magnetic recording medium described above having an average height ($H_2$) of protrusions formed using the second particles in the numerical range described above, the number of occurrences of a rise in friction according to several times of running is small, and it contributes to being able to appropriately maintain a polishing force for a magnetic head.

In addition, although a lower limit of the average height ($H_2$) of protrusions formed using the second particles described above is not particularly limited, for example, it may be preferably 2.0 nm or more, more preferably 2.5 nm or more, and further more preferably 3.0 nm or more.

The number of the protrusions formed using the first particles described above on the surface of the magnetic layer side described above per unit area ($\mu m^2$) may be preferably 0.3 or more and 1.9 or less, more preferably 0.4 or more and 1.8 or less, further more preferably 0.5 or more and 1.7 or less, and yet further more preferably 0.6 or more and 1.6 or less. A method for measuring the number of protrusions formed using the first particles described above will be described below in 2.(3).

On the surface of the magnetic layer side described above, the ratio of the first particles forming protrusions having protrusion heights of 10 nm or more to the first particles forming protrusions having protrusion heights of 4 nm or more is preferably 60% or less, more preferably 50% or less, further more preferably 40% or less, and yet further more preferably 30% or less. A method for measuring the ratio of the first particles described above will be described below in 2.(3).

The number of protrusions formed using the second particles described above on the surface of the magnetic layer side described above may be two or more per unit area ($\mu m^2$). A method for measuring the number of protrusions formed using the first particles described above will be described below in 2.(3).

On the surface of the magnetic layer side, a ratio of the second particles forming protrusions having protrusion heights of 10 nm or more to the second particles forming protrusions having protrusion heights of 4 nm or more may be preferably 20% or less, more preferably 18% or less, further more preferably 16% or less, and yet further more preferably 14% or less. A lower limit value of the ratio of the second particles described above is not particularly limited and may be preferably 0% or more. A method for measuring the ratio of the second particles described above will be described below in 2.(3).

The magnetic recording medium according to the present technology is preferably a magnetic recording medium of a long form and, for example, may be a magnetic recording tape (particularly, a magnetic recording tape of a long form).

The magnetic recording medium according to the present technology may include a magnetic layer, a non-magnetic layer (an underlayer), a base layer, and a back layer in this order and may include other layers in addition to these layers. These other layers may be appropriately selected in accordance with a type of the magnetic recording medium. The magnetic recording medium described above is a coating-type magnetic recording medium. Regarding layers included in the magnetic recording medium described above other than the four layers described above, such description may be referred to.

In the magnetic recording medium according to the present technology, from a point of view of inhibiting a rise in friction for a magnetic head by improving a polishing force and cleaning attachments attached to the magnetic head, abrasivity for an AlTiC rectangular prism may be preferably 12.5 or more, more preferably 13.0 or more, further more preferably 14.0 or more, and yet further more preferably 15.0 or more. A method for measuring abrasivity for an AlTiC rectangular prism will be described below in 2.(3).

From a point of view of preventing advancement of wear of a magnetic head due to a too high polishing force leading to destruction of the magnetic head, the abrasivity for an AlTiC rectangular prism may be preferably 20 or less, more preferably 19 or less, further more preferably 18 or less, and yet further more preferably 17 or less.

In addition, preferably, the abrasivity for an AlTiC rectangular prism may satisfy the following relational expression.

$$12.5 \leq \text{Abrasivity} \leq 20$$

Furthermore, more preferably, the abrasivity for an AlTiC rectangular prism may satisfy the following relational expression.

$$13.0 \leq \text{Abrasivity} \leq 19$$

In addition, more preferably, the abrasivity for an AlTiC rectangular prism may satisfy the following relational expression.

$$14.0 \leq \text{Abrasivity} \leq 18$$

Furthermore, more preferably, the abrasivity for an AlTiC rectangular prism may satisfy the following relational expression.

$$15.0 \leq \text{Abrasivity} \leq 17$$

An average thickness (an average whole thickness) $t_T$ of the magnetic recording medium according to the present technology, for example, may be 5.7 μm or less, preferably 5.6 μm or less, 5.5 μm or less, 5.4 μm or less, or 5.3 μm or less, more preferably 5.2 μm or less or 5.0 μm or less, further more preferably 4.6 μm or less, and yet further more preferably 4.4 μm or less. Since the magnetic recording medium described above is configured to be thin as above, for example, a length of the tape wound in one magnetic recording cartridge can be configured to be long, and, in accordance with this, a recording capacity per magnetic recording cartridge can be raised. A lower limit value of the average thickness (average whole length) $t_T$ of the magnetic recording medium is not particularly limited and, for example, is 3.5 μm $\leq t_T$.

An average thickness $t_m$ of the magnetic layer of the magnetic recording medium according to the present technology may be preferably 0.08 μm or less, more preferably 0.07 μm or less, further more preferably 0.06 μm or less, 0.05 μm or less, and yet further more preferably 0.04 μm or less. A lower limit value of the average thickness $t_m$ of the magnetic layer is not particularly limited and, preferably, may be 0.03 μm or more. A method for measuring the average thickness of the magnetic layer will be described below in 2.(3).

An average thickness of the non-magnetic layer (an average thickness of the underlayer) of the magnetic recording medium according to the present technology may be preferably 1.2 μm or less, more preferably 1.0 μm or less, 0.9 μm or less, 0.8 μm or less, or 0.7 μm or less, and further more preferably 0.6 μm or less. A lower limit value of the average thickness of the non-magnetic layer is not particularly limited and may be preferably 0.2 μm or more and more preferably 0.3 μm or more. A method for measuring the average thickness of the non-magnetic layer will be described below in 2.(3).

An average thickness of the base layer of the magnetic recording medium according to the present invention may be preferably 4.5 μm or less, more preferably 4.2 μm or less, 4.0 μm or less, or 3.6 μm or less, and further more preferably 3.0 μm or less. A method for measuring the average thickness of the base layer will be described below in 2.(3).

An average thickness of the back layer of the magnetic recording medium according to the present invention may be preferably 0.6 μm or less, more preferably 0.5 μm or less, and further more preferably 0.4 μm or less, 0.3 μm or less, or 0.25 μm or less. A method for measuring the average thickness of the back layer will be described below in 2.(3).

An average particle volume of magnetic powders included in the magnetic recording medium according to the present technology may be 2,600 nm³ or less, preferably 2,000 nm³ or less, and more preferably 1,600 nm³ or less. In accordance with this average particle volume being in the numerical range described above, electromagnetic conversion characteristics are improved. Although the average particle volume of magnetic powders included in the magnetic recording medium according to the present technology is very small, the magnetic recording medium according to the present technology has superior thermal stability as described above. Although it is difficult to have both the electromagnetic conversion characteristics and the terminal stability, both the electromagnetic conversion characteristics and the terminal stability can be improved using the present technology.

For example, the average particle volume of magnetic powders may be 500 nm³ or more, and more particularly, 700 nm³ or more. A method for measuring the average particle volume of magnetic powders will be described below in 2.(3).

In the present technology, a squareness ratio in a vertical direction may be preferably 65% or more, more preferably 67% or more, and further more preferably 70% or more. In accordance with the squareness ratio being in the numerical range described above, the vertical orientation of magnetic powders becomes sufficiently high, and thus a far superior cNR can be acquired. Thus, far superior electromagnetic conversion characteristics can be acquired. A method for measuring the squareness ratio in the vertical direction will be described below in 2.(3).

A magnetic recording medium according to the present technology, for example, may include at least one data band and at least two servo bands. For example, the number of data bands may be 2 to 10, particularly 3 to 6, and more particularly 4 or 5. For example, the number of servo bands may be 3 to 11, particularly 4 to 7, and more particularly 5 or 6. For example, these servo bands and data bands may be disposed to extend in a longitudinal direction of the magnetic recording medium (particularly, a magnetic recording tape) having a long form, particularly, approximately in parallel with each other. The data bands described above and the servo bands described above may be disposed in the magnetic layer described above. In this way, an example of the magnetic recording medium having the data bands and the servo bands includes a magnetic recording tape that is compliant with Linear Tape-Open (LTO) standards. In other words, the magnetic recording medium according to the present technology may be a magnetic recording medium that is in compliance with the LTO standards. For example, the magnetic recording medium according to the present technology may be a magnetic recording tape that is compliant with LTO8 or subsequent standards (for example, LTO9, LTO10, LTO11, LTO12, or the like).

For example, a width of the magnetic recording medium (particularly, the magnetic recording tape) having a long form according to the present technology is 5 mm to 30 mm, particularly, 7 mm to 25 mm, more particularly 10 mm to 20 mm, and further more particularly 11 mm to 19 mm. A length of the magnetic recording medium (particularly, the magnetic recording tape) having a long form, for example, may be 500 m to 1500 m. For example, a tape width that is compliant with the LTO8 standards is 12.65 mm, and a length thereof is 960 m.

2. First Embodiment

(1) Configuration of Magnetic Recording Medium

First, the configuration of a magnetic recording medium 10 according to a first embodiment will be described with reference to FIG. 1. The magnetic recording medium 10, for example, is a magnetic recording medium for which vertical orientation processing has been performed and includes, as illustrated in FIG. 1, a base layer (also referred to as a base body) 11 having a long form, a non-magnetic layer (also referred to as an underlayer) 12 disposed on one principal face of the base layer 11, a magnetic layer (also referred to as a recording layer) 13 disposed on the non-magnetic layer 12, and a back layer 14 disposed on the other principal face of the base layer 11. Hereinafter, a face on a side on which the magnetic layer 13 out of both principal faces of the magnetic recording medium 10 will be referred to as a magnetic face, and a face on a side opposite to this magnetic face (a face on a side on which the back layer 14 is disposed) will be referred to as a back face.

The magnetic recording medium 10 has a long form and runs in a longitudinal direction at the time of recording and reproducing. In addition, the magnetic recording medium 10 may be configured to be able to record a signal using a shortest recording wavelength of preferably 100 nm or less, more preferably 75 nm or less, further more preferably 60 nm or less, and particularly preferably 50 nm or less and, for example, can be used in a recording and reproducing device of which a shortest recording wavelength is in the range described above. This recording and reproducing device may include a ring-type head as a recording head. For example, a recording track width is 2 µm or less.

(2) Description of Each Layer (Base Layer)

The base layer 11 is able to function as a support body of the magnetic recording medium 10 and, for example, is a non-magnetic base body of a long form having flexibility and may be particularly a non-magnetic film. For example, an average thickness of the base layer 11 is preferably 4.5 µm or less, more preferably 4.2 µm or less, 4.0 µm or less, or 3.6 µm or less, and further more preferably 3.0 µm or less. In addition, a lower limit of the average thickness of the base layer 11 may be determined from points of view of the limit of film manufacturing, a function of the base layer 11, and the like. For example, the base layer 11 may contain at least one of a polyester-based resin, a polyolefin-based resin, a cellulose derivative, a vinyl-based resin, an aromatic polyether ketone resin, and other polymer resins. In a case in which the base layer 11 contains two or more types among the materials described above, the materials of such two or more types may be mixed, co-polymerized, or laminated.

This polyester resin described above, for example, may be a mixture of one or two or more of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxycarboxylate. In accordance with a preferred embodiment of the present technology, the base layer 11 may be formed from PET or PEN.

For example, the polyolefin-based resin described above may be one type or a mixture of two or more types of polyethylene (PE) and polypropylene (PP).

For example, the cellulose derivative described above may be one or a mixture of two or more among cellulose diacetate, cellulose triacetate, cellulose acetate butyrate (CAB), and cellulose acetate propionate (CAP).

The vinyl-based resin described above may be one or a mixture of two or more types among polyvinyl chloride (PVC) and polyvinylidene chloride (PVDC).

For example, the aromatic polyether ketone resin may be one or a mixture of two or more of polyether ketone (PEK), polyether ether ketone (PEEK), polyether ether ketone ketone (PEKK), and polyether ether ketone ketone (PEEKK). In accordance with a preferred embodiment of the present technology, the base layer 11 may be formed from PEEK.

For example, the other polymer resin may be one or a mixture of two or more of polyamide (PA, nylon), aromatic polyamide (PA, aramid), polyimide (PI), aromatic polyimide (PI), polyamide imide (PAI), aromatic polyamide imide (PAI), polybenzoxazole (PBO; for example, xyron (registered trademark)), polyether, polyether ester, polyether sulfone (PES), polyetherimide (PEI), poly sulfone (PSF), polyphenylene sulfide (PPS), polycarbonate (PC), polyarylate (PAR), and polyurethane (PU).

(Magnetic Layer)

For example, the magnetic layer 13 may be a vertical recording layer. The magnetic layer 13 contain magnetic powders. The magnetic layer 13 contains first particles having conductivity and second particles of which a Mohs hardness is 7 or more, which are added to the magnetic powders. In addition, for example, the magnetic layer 13 may further include a binding agent. The magnetic layer 13, as necessary, for example, may further include additives such as lubricant, a rust inhibitor, and the like.

An average thickness $t_m$ of the magnetic layer 13 may be preferably 0.08 µm or less, more preferably 0.07 µm or less, and further more preferably 0.06 µm or less, 0.05 µm or less, or 0.04 µm or less. A lower limit value of the average thickness $t_m$ of the magnetic layer 13 is not particularly limited and may be preferably 0.03 µm or less. The average thickness $t_m$ of the magnetic layer 13 being within the numerical range described above contributes to improvement of the electromagnetic conversion characteristics.

The magnetic layer 13 is preferably a magnetic layer that is vertically oriented. In this specification, vertical orientation represents that a squareness ratio S1 measured in a longitudinal direction (a running direction) of the magnetic recording medium 10 is 35% or less.

In addition, the magnetic layer 13 may be a magnetic layer that is in-plane oriented (longitudinally oriented). In other words, the magnetic recording medium 10 may be a magnetic recording medium of a horizontal recording type. From a point of view of a high recording density, vertical orientation is more preferable.

(Magnetic Powder)

Examples of magnetic particles forming magnetic powders contained in the magnetic layer 13 include an epsilon-type iron oxide (ε-iron oxide), gamma hematite, magnetite, chromium dioxide, a cobalt-coated iron oxide, hexagonal ferrite, barium ferrite (BaFe), Co ferrite, strontium ferrite, metal, and the like and are not limited thereto. The magnetic powders described above may be one of these or may be a combination of two or more thereof. Particularly preferably, the magnetic powders described above may include ε-iron oxide magnetic powders, barium ferrite magnetic powders, cobalt ferrite magnetic powders, or strontium ferrite magnetic powders. In addition, the ε-iron oxide may contain Ga and/or Al. Such magnetic particles, for example, may be appropriately selected by a person skilled in the art on the basis of factors such as a method for manufacturing the magnetic layer 13, specifications of the tape, functions of the tape, and the like.

An average particle size of magnetic powders (an average maximum particle size) D may be preferably 22 nm or less, more preferably 8 nm or more and 22 nm or less, and further more preferably 10 nm or more and 20 nm or less.

The average particle size D of the magnetic powders described above can be acquired as below. First, a thin piece is produced by processing a magnetic recording medium 10 that is a measurement target using a focused ion beam (FIB) method or the like, and a cross-section of the thin piece is observed using TEM. Next, 500 ε-iron oxide particles are randomly selected from a captured TEM photograph, and maximum particle sizes $d_{max}$ of the particles are measured, whereby a grain size distribution of the maximum particle sizes $d_{max}$ of the magnetic powders is acquired. Here, "maximum particle size $d_{max}$" represents so-called a maximum ferret diameter and, more specifically, represents a maximum of distances between two parallel lines drawn from all the angles such that the parallel lines are in contact with a contour of an ε-iron oxide particle. Thereafter, a median diameter (50% diameter, D50) of the maximum particle size $d_{max}$ is acquired from the acquired grain size distribution of the maximum particle sizes $d_{max}$, and this is set as an average particle size (an average maximum particle size) D of the magnetic powders.

Preferably, the shape of the magnetic powders is at least one of a plate shape, a sphere shape, and a square shape. The shape of magnetic powders depends on the crystal structure of magnetic particles. Examples of magnetic powders of which a shape is a plate shape include BaFe and strontium ferrite having a shape of a hexagonal plate. An example of magnetic powders of which a shape is a sphere shape includes an ε-iron oxide. An example of magnetic powders of which a shape is a square shape includes cobalt ferrite having a cube shape. In the process of manufacturing the magnetic recording medium 10, such magnetic particles are oriented.

In accordance with one preferred embodiment of the present technology, the magnetic powders described above may preferably include powders of nano particles including ε-iron oxides (hereinafter, referred to as "ε-iron oxide particles"). An ε-iron oxide particle can acquire a high coercive force even in a case in which it is a fine particle. It is preferable that ε-iron oxides included in the ε-iron oxide particle have crystals oriented in a thickness direction (a vertical direction) of the magnetic recording medium 10 with priority.

The ε-iron oxide particle has a sphere shape or an approximately sphere shape or has a cubic shape or an approximately cubit shape. Since the ε-iron oxide particle has the shape as described above, in a case in which the ε-iron oxide particles are used as magnetic particles, compared to a case in which barium ferrite particles of a hexagonal plate shape are used as magnetic particles, a contact area between particles in the thickness direction of the medium is decreased, and thus aggregation between the particles can be inhibited. Thus, the dispersibility of the magnetic powder is raised, and a better Signal-to-Noise Ratio (SNR) can be acquired.

The ε-iron oxide particles have a core-shell type structure. Specifically, the ε-iron oxide particles have a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of ε-$Fe_2O_3$ crystal as a main phase, and more preferably composed of single-phase ε-$Fe_2O_3$.

The first shell part covers at least a part of the periphery of the core part. Specifically, the first shell part may partially cover the periphery of the core part or may cover the entire periphery of the core part. In order to make exchange coupling between the core part and the first shell part sufficient and improve magnetic characteristics, it is preferable to cover the entire surface of the core part.

The first shell part is a so-called soft magnetic layer, and contains, for example, a soft magnetic body such as α-Fe, Ni—Fe alloys or Fe—Si—Al alloys. α-Fe may be obtained by reducing the ε-iron oxide contained in the core part.

The second shell part is an oxide film as an antioxidant layer. The second shell part may contain α-iron oxide, aluminum oxide or silicon oxide. For example, the α-iron oxide may include at least one iron oxide among $Fe_3O_4$, $Fe_2O_3$, and FeO. In a case in which the first shell part contains α-Fe (soft magnetic body), the α-iron oxide may be acquired by oxidating α-Fe contained in the first shell part.

In accordance with the ε-iron oxide particle having the first shell part as described above, the thermal stability can be secured, and, in accordance with this, the coercive force He of the core part as a single body can be maintained to have a large value and/or the coercive force He of the ε-iron oxide particle (core shell-type particle) as a whole can be adjusted to a coercive force He that is appropriate for recording. In addition, in accordance with the ε-iron oxide particle having the second shell part as described above, in the process of manufacturing the magnetic recording medium 10 and before the process, degradation of characteristics of the ε-iron oxide particle due to exposure of the ε-iron oxide particle to the air and generation of rust and the like on the surface of the particle can be inhibited. Thus, characteristic degradation of the magnetic recording medium 10 can be inhibited.

The ε-iron oxide particle may have a shell part having a single-layer structure. In this case, the shell part has the same configuration as the first shell part. Here, from a point of view of inhibiting characteristic degradation of the ε-iron oxide particle, it is more preferable that the ε-iron oxide particle have a shell part of a two-layer structure.

The ε-iron oxide particle may include an additive in place of the core shell structure or may have a core shell structure and include an additive. In such a case, a part of Fe of the ε-iron oxide particle is substituted with the additive. Also in accordance with the ε-iron oxide particle including an additive, the coercive force He of the entire ε-iron oxide particle can be adjusted to a coercive force He that is appropriate for recording, and thus easiness in recording can be improved. The additive is a metal element other than iron, preferably a trivalent metal element, and more preferably one or more selected from a group consisting of aluminum (Al), gallium (Ga), and indium (In).

More specifically, the ε-iron oxide containing an additive is a ε-$Fe_{2-x}M_xO_3$ crystal (here, M is a metal element other than iron, preferably a trivalent metal element, and more preferably one or more selected from a group consisting of Al, Ga, and In; x, for example, is 0<x<1).

In accordance with another preferred embodiment of the present technology, the magnetic powders described above may be barium ferrite (BaFe) magnetic powders. The barium ferrite magnetic powders contain magnetic particles of iron oxides having barium ferrite as its main phase (hereinafter, referred to as "barium ferrite particles"). The barium ferrite magnetic powders, for example, have high reliability of data recording such as no degradation of an antimagnetic force also in a high-temperature high-humidity environment and the like. From such a point of view, the barium ferrite magnetic powders are preferable as the magnetic powders described above.

An average particle size of barium ferrite magnetic powders may be 50 nm or less, more preferably 10 nm or more and 40 nm or less, and further more preferably 12 nm or more and 25 nm or less.

In a case in which the magnetic layer 13 contains barium ferrite magnetic powders as magnetic powders, an average thickness $t_m$ [nm] of the magnetic layer 13 may be preferably 0.08 μm or less, more preferably 0.07 μm or less, and further more preferably 0.06 μm or less. In addition, the coercive force Hc measured in the thickness direction (the vertical direction) of the magnetic recording medium 10 may be preferably 160 kA/m or more and 280 kA/m or less, more preferably 165 kA/m or more and 275 kA/m or less, and further more preferably 170 kA/m or more and 270 kA/m or less.

According to further another preferred embodiment of the present technology, the magnetic powders may be cobalt ferrite magnetic powders. The cobalt ferrite magnetic powders include magnetic particles of an iron oxide having cobalt ferrite as its main phase (hereinafter, referred to as "cobalt ferrite magnetic particles"). The cobalt ferrite magnetic particles preferably have uniaxial crystal anisotropy. For example, the cobalt ferrite magnetic particles have a cubic shape or an approximately cubic shape. The cobalt ferrite is cobalt ferrite containing CO. The cobalt ferrite may further include one or more selected from a group consisting of Ni, Mn, Al, Cu, and Zn other than Co.

For example, cobalt ferrite has an average composition represented in the following Formula (1).

$$Co_xM_yFe_2O_z \quad (1)$$

Here, in Formula (1), for example, M is a metal of one or more selected from a group consisting of Ni, Mn, Al, Cu, and Zn. x is a value in the range of 0.4≤x≤1.0. y is a value in the range of 0≤y≤0.3. Here x and y satisfy a relationship of (x+y)≤1.0. z is a value in the range of 3≤z≤4. A part of Fe may be substituted with another metal element.)

An average particle size of cobalt ferrite magnetic powders may be preferably 25 nm or less and more preferably 23 nm or less. A coercive force Hc of cobalt ferrite magnetic powders may be preferably 2500 Oe or more and more preferably 2600 Oe or more and 3500 Oe or less.

In accordance with a further another preferred embodiment of the present technology, the magnetic powders may include powders of nano particles containing hexagonal ferrite (hereinafter, referred to as "hexagonal ferrite particles"). For example, the hexagonal ferrite particle has a hexagonal plate shape or an approximately hexagonal plate shape. The hexagonal ferrite may preferably contain at least one of Ba, Sr, Pb, and Ca and more preferably at least one of Ba and Sr. More specifically, the hexagonal ferrite, for example, may be barium ferrite or a strontium ferrite. The barium ferrite may further contain at least one of Sr, Pb and Ca in addition to Ba. The strontium ferrite may further contain at least one of Ba, Pb and Ca in addition to Sr.

More specifically, the hexagonal ferrite has an average composition represented by a general formula of $MFe_{12}O_{19}$. Here, M is, for example, at least one metal of Ba, Sr, Pb and Ca, and preferably at least one metal of Ba and Sr. M may be a combination of Ba and at least one metal selected from the group consisting of Sr, Pb and Ca. In addition, M may be a combination of Sr, and at least one metal selected from the group consisting of Ba, Pb and Ca. In the above general formula, some of Fe may be replaced with other metal elements.

In a case in which the magnetic powders contain powders of hexagonal ferrite particles, an average particle size of the magnetic powders may be preferably 50 nm or less, more preferably 10 nm or more and 40 nm or less, and further more preferably 15 nm or more and 30 nm or less.

(First Particle)

The first particle has conductivity. As the first particle, a fine particle having carbon as its main component can be used and, for example, the first particle may be preferably a carbon particle, and an example of such a carbon particle is carbon black. As the carbon black, for example, Asahi #15, #15HS, or the like of Asahi Carbon Corp. can be used. In addition, hybrid carbon acquired by attaching carbon to a silica particle surface may be also used.

(Second Particle)

From a point of view of inhibiting deformation according to a contact with the magnetic head, the Mohs hardness of the second particle may be 7 or more, preferably 7.5 or more, more preferably 8 or more, and further more preferably 8.5 or more. From a point of view of inhibiting wear of the head, the Mohs hardness of the second particle may be preferably 9.5 or less. The second particle may be preferably an inorganic particle and, examples thereof include α-alumina with an a transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, those obtained by performing a surface treatment on the above materials with aluminum and/or silica as necessary, a diamond powder, and the like. As the second particle, an alumina particle such as α-alumina, β-alumina, γ-alumina, or the like or silicon carbide is preferably used. These second particles may have any of shapes such as a needle shape, a sphere shape, a dice shape, and the like, preferably have a corner in a part of the shape to have high abrasivity.

(Average Height of Protrusions Formed in Accordance with First Particle and Second Particle)

Protrusions are formed on the surface of the magnetic layer side described above in accordance with the first particles and the second particles described above. A ratio ($H_1/H_2$) of an average height ($H_1$) of protrusions formed in accordance with the first particles described above to an average height ($H_2$) of protrusions formed in accordance with the second particles described above may be 2.3 or less, preferably 2.1 or less, more preferably 1.9 or less, further more preferably 1.7 or less, or yet further more preferably 1.6 or less. In accordance with the magnetic recording medium described above having the ratio ($H_1/H_2$) of the average heights of protrusions to be in the numerical range described above, the number of occurrences of a friction rise (PES rise) according to several times of running is small, and it contributes to being able to appropriately maintain a polishing force for the magnetic head.

In addition, a lower limit of the ratio ($H_1/H_2$) of the average heights of the protrusions described above is not particularly limited and, for example, may be preferably 1.0 or more, more preferably 1.1 or more, and further more preferably 1.2 or more.

The average height ($H_1$) of the protrusions formed in accordance with the first particles may be 12 nm or less, preferably 11.5 nm or less, more preferably 10.5 nm or less, further more preferably 9.5 nm or less, and yet further more preferably 8.5 nm or less. In accordance with the magnetic recording medium described above having the average height ($H_1$) of protrusions formed in accordance with the first particles to be in the numerical range described above, an amount of spacing between the magnetic head and the magnetic recording medium is configured to be small, the number of occurrences of friction rise according to several times of running is small, and it contributes to being able to appropriately maintain a polishing force for the magnetic head.

A lower limit of the average height ($H_1$) of the protrusions formed in accordance with the first particles described above is not particularly limited and, for example, may be preferably 5.0 nm or more, more preferably 5.5 nm or more, and further more preferably 6.0 nm or more.

The average height ($H_2$) of the protrusions formed in accordance with the second particles may be 7 nm or less, preferably 6.5 nm or less, more preferably 6.0 nm or less, further more preferably 5.5 nm or less, and yet further more preferably 5.3 nm or less. In accordance with the magnetic recording medium described above having the average height ($H_2$) of the protrusions formed in accordance with the second particles to be in the numerical range described above, an amount of spacing between the magnetic head and the magnetic recording medium is configured to be small, the number of occurrences of friction rise according to several times of running is small, and it contributes to being able to appropriately maintain a polishing force for the magnetic head.

A lower limit of the average height ($H_2$) of the protrusions formed in accordance with the second particles described above is not particularly limited and, for example, may be preferably 2.0 nm or more, more preferably 2.5 nm or more, and further more preferably 3.0 nm or more.

(Number of Protrusions Per Unit Area Formed in Accordance with First Particle)

The number of protrusions formed in accordance with the first particles described above on the surface of the magnetic layer side described above per unit area (1 m$^2$) is preferably 0.3 or more and 1.9 or less, more preferably 0.4 or more and 1.8 or less, further more preferably 0.5 or more and 1.7 or less, and yet further more preferably 0.6 or more and 1.6 or less.

(Ratio of First Particles Described Above Forming Protrusions Having Protrusion Height of 10 nm or More)

A ratio of the above-described first particles forming protrusions having protrusion heights of 10 nm or less to the above-described first particles forming protrusions having protrusion heights of 4 nm or more on the surface of the magnetic layer side described above may be preferably 60% or less, more preferably 50% or less, further more preferably 40% or less, and yet further more preferably 30% or less.

(Number of Protrusions Per Unit Area Formed in Accordance with Second Particle)

The number of protrusions formed in accordance with the second particles described above on the surface of the magnetic layer side described above per unit area (μm$^2$) may be preferably 2 or more.

(Ratio of Second Particles Described Above Forming Protrusions Having Protrusion Height of 10 nm or More)

A ratio of the above-described second particles forming protrusions having protrusion heights of 10 nm or more to the above-described second particles forming protrusions having protrusion heights of 4 nm or more on the surface of the magnetic layer side described above may be 20% or less, preferably 18% or less, more preferably 16% or less, and further more preferably 14% or less. A lower limit value of the ratio of the second particles forming protrusions having protrusion heights of 10 nm or more is not particularly limited and may be preferably 0% or more.

(Binding Agent)

As a biding agent, a resin having a structure acquired by causing a cross-linking reaction on a polyurethan resin, a vinyl chloride resin, or the like is preferable. However, the binding agent is not limited thereto, and any other resin may be appropriately mixed in accordance with physical properties required for the magnetic recording medium 10. Generally, a resin to be mixed is not particularly limited, as long as it is a resin that is generally used in the coating-type magnetic recording medium 10.

Examples of the binding agent described above, for example, include polyvinyl chloride, polyvinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, and nitrocellulose), styrene butadiene copolymers, polyester resins, amino resins, synthetic rubber, and the like.

In addition, as the binding agent described above, thermosetting resins or reaction-type resins may be used, and examples thereof include phenolic resins, epoxy resins, urea resins, melamine resins, alkyd resins, silicone resins, polyamine resins, urea formaldehyde resins, and the like.

In addition, as each binding agent described above, for the purpose of improving dispersibility of magnetic powders, polar functional groups such as —SO$_3$M, —OSO$_3$M, —COOM, P=O(OM)$_2$, and the like may be introduced. Here, in the formula, M is a hydrogen atom or an alkali metal, for example, such as lithium, potassium, natrium, or the like.

In addition, examples of the polar functional group include a side-chain type having a terminal group of —NR1R2 and —NR1R2R3+X$^-$ and a main chain type of >NR1R2$^+$X$^-$. Here, in the formula, R1, R2, and R3 are hydrogen atoms or hydrocarbon groups, and X$^-$ is halogen atom ion such as fluoride, chloride, brome, iodine, or the like or an inorganic or organic ion. In addition, examples of the polar functional group include —OH, —SH, —CN, an epoxy group, and the like.

(Additive)

The magnetic layer 13 may further contain an aluminum oxide (α, β, or γ-alumina), a chrome oxide, a silicon oxide, diamond, garnet, emery, boron nitride, titanium carbide, silicon carbide, titanium carbide, titanium oxide (rutile type or anatase type titanium oxide), and the like as a non-magnetic reinforcing particle.

(Non-Magnetic Layer (Underlayer))

The non-magnetic layer (the underlayer) 12 is a non-magnetic layer containing a non-magnetic powder and a binding agent as its main components. The description of the binding agent included in the magnetic layer 13 described above can be also applied to the binding agent included in the non-magnetic layer 12. The non-magnetic layer 12, as necessary, may further contain at least one additive among a first particle, lubricant, a curing agent, an antirust agent, and the like.

An average thickness of the non-magnetic layer 12 is preferably 1.2 μm or less, more preferably 1.0 μm or less, 0.9 μm or less, 0.8 μm or less, or 0.7 μm or less, and furthermore preferably 0.6 μm or less. A lower limit value of the average thickness of the non-magnetic layer 12 is not particularly limited and is preferably 0.2 μm or more and more preferably 0.3 μm or more.

(Non-Magnetic Powder)

For example, the non-magnetic powder contained in the non-magnetic layer 12 may include at least one selected from inorganic particles and organic particles. Here, one type of non-magnetic powder may be used alone, or two or more types of non-magnetic powders may be used in combination. Examples of inorganic particles include one or a combination of two or more selected from metals, metal oxides, metal carbonates, metal sulfates, metal nitrides, metal carbides, and metal sulfides, and the like. More specifically, for example, the inorganic particle may be one or two or more selected from iron oxyhydroxide, hematite, a titanium oxide, and carbon black. The shape of the non-magnetic powder, for example, may be any of various shapes such as a needle shape, a sphere shape, a cubic shape, a plate shape, and the like and is not limited thereto.

(Back Layer)

The back layer 14 may contain a binding agent and a non-magnetic powder. The back layer 14 may contain various additives such as a lubricant, a curing agent, an antistatic agent, and the like, as necessary. The descriptions relating to the binding agent and the non-magnetic powder included in the non-magnetic layer 12 described above can also be applied to the binding agent and the non-magnetic powder included in the back layer 14.

An average particle size of inorganic particles included in the back layer 14 is preferably 10 nm or more and 150 nm or less and more preferably 15 nm or more and 110 nm or less. The average particle size of the inorganic particles can be acquired similar to the average particle size D of the magnetic powders described above.

An average thickness $t_b$ of the back layer 14 may be preferably 0.6 μm or less, more preferably 0.5 μm or less, and further more preferably 0.4 μm or less, 0.3 μm or less, 0.25 μm or less, or 0.2 μm or less. In accordance with the average thickness $t_b$ of the back layer 14 being in the range described above, even when the average thickness (the average whole thickness) $t_T$ of the magnetic recording medium 10 is configured to be $t_T \leq 5.7$ μm, the average thicknesses of the non-magnetic layer 12 and the base layer 11 can be maintained to be large, and, in accordance therewith, running stability of the magnetic recording medium 10 inside a recording and reproducing device can be maintained.

(3) Physical Property and Structure (Height of Protrusion)

Heights of protrusions formed in accordance with the first particles and the second particles, as will be described below, are measured by performing shape analysis using an atomic force microscope (hereinafter, referred to as an AFM) for the same position of a measurement sample and determination of components that have been image-analyzed using a luminance difference according to a difference of the secondary electron discharge amounts of the first particles and the second particles from an FE-SEM image captured using a field emission-type scanning electron microscope (hereinafter, referred to as FE_SEM). The height of each protrusion can be measured using the AFM, and it can be identified whether each protrusion is formed in accordance with the first particles or the second particles using the FE-SEM described above. A composite image is acquired by overlapping an image acquired using the AFM described above for the same position and an image acquired using the FE-SEM described above for the certain area described above, and, from the acquired composite image, a type of particle forming each protrusion (one of the first particle and the second particle) and a height of each protrusion can be associated with each other. Hereinafter, a method for measuring a height of a protrusion using the AFM, a method for identifying a type of particle forming a protrusion using the FE-SEM, and a method for associating a height of a protrusion and a type of particle forming the protrusion will be described.

(Method for Measuring Height of Protrusion Using Atomic Force Microscope (AFM))

Figure 17:
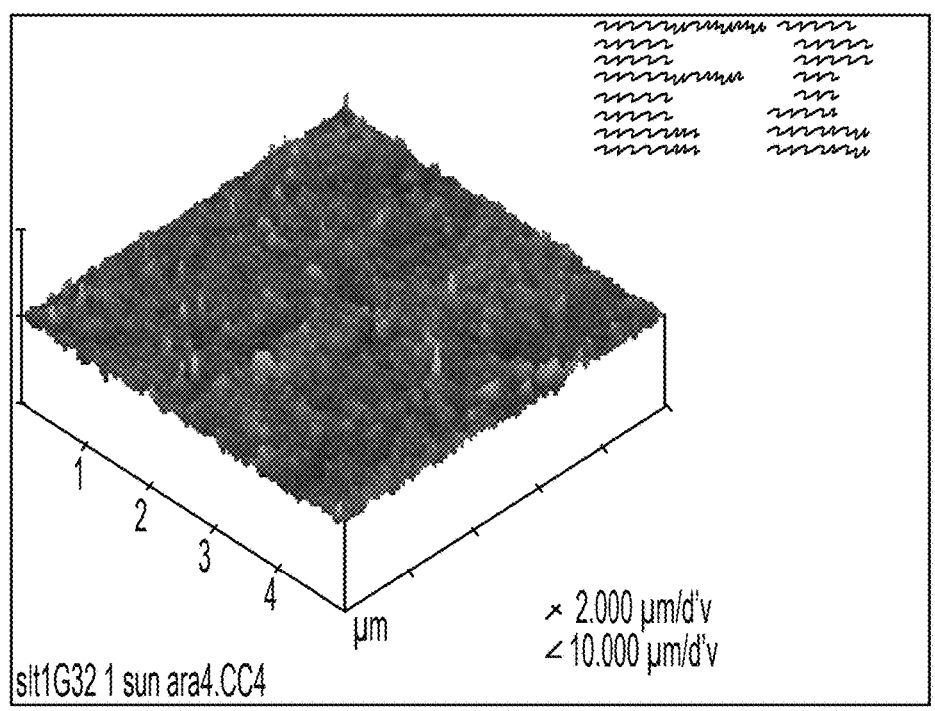
FIG. 17 is an image illustrating an example of a surface shape imaged using AFM.
Figure 18:
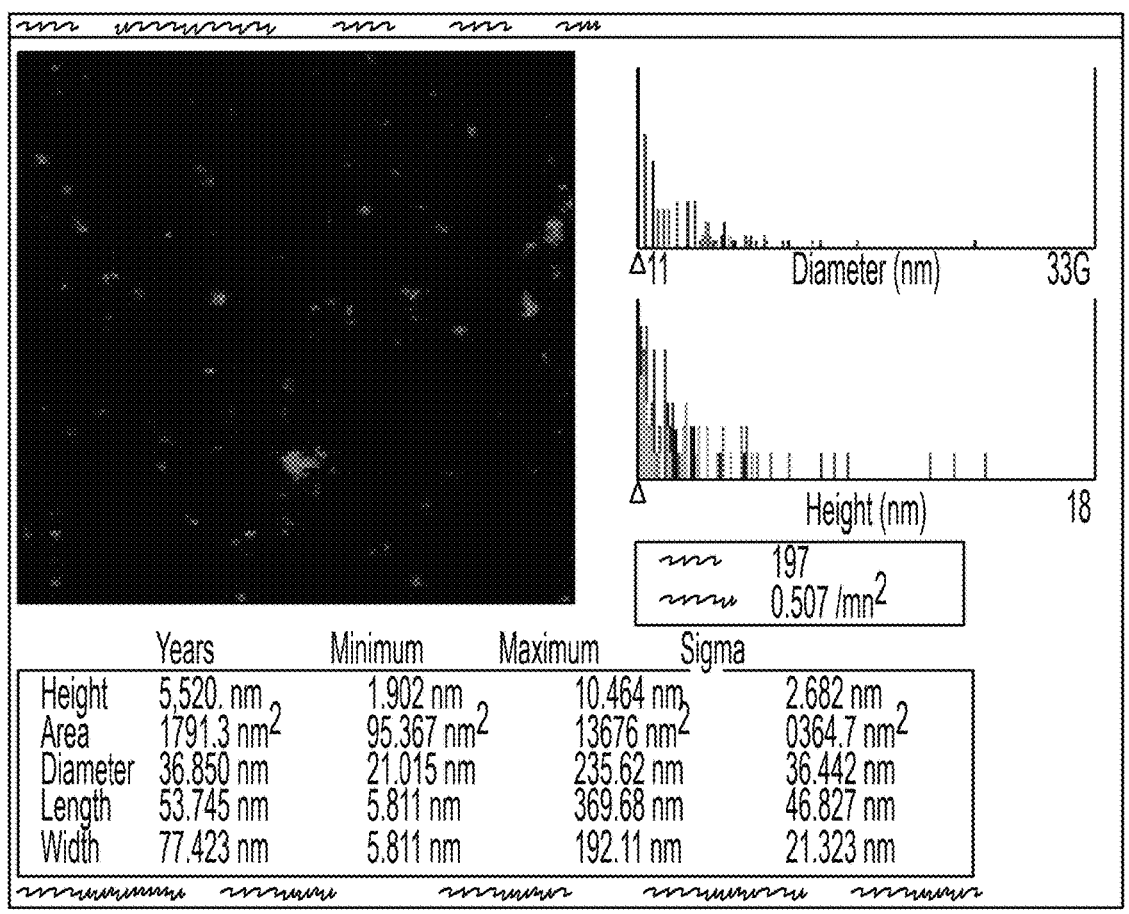
FIG. 18 is a diagram illustrating an example of a protrusion analysis result using AFM.
Figure 19:
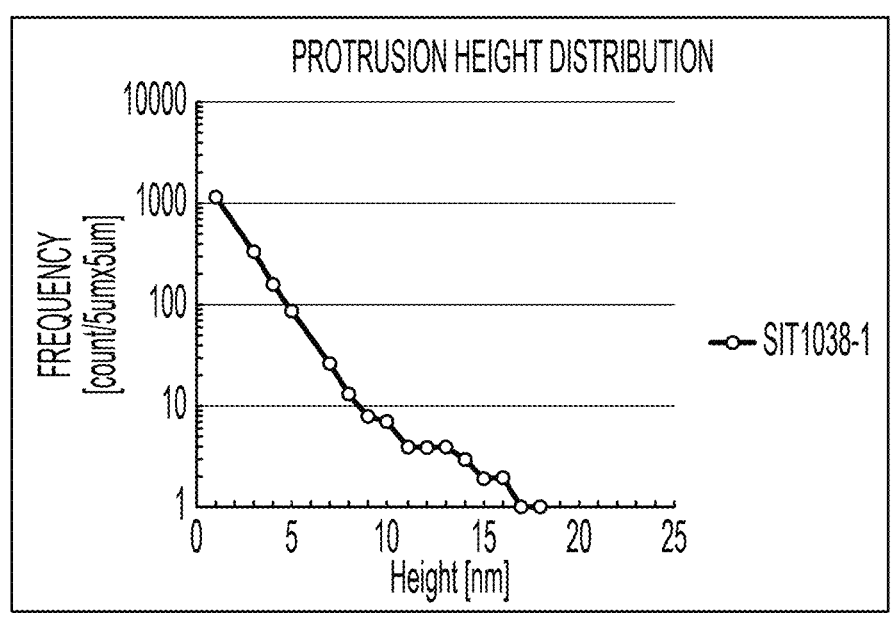
FIG. 19 is a diagram illustrating an example of a protrusion height distribution according to AFM.

In the present technology, heights of protrusions formed in accordance with the first particles and the second particles can be acquired as below. A measurement sample is produced by cutting a magnetic recording medium 10 of a user data area (24 m from a reader pin and thereafter) inside an LTO cartridge corresponding to a size for riding on a SEM observation sample stage. Next, a surface of the measurement sample is marked by avoiding a center part of the measurement sample. Examples of the marking method include a method in which depressions are formed on the magnetic recording medium 10 in a linear shape or a dot shape using a manipulator, a ninedenter or the like, a method in which convex parts are formed on the magnetic recording medium 10 using silver paster or the like, and the like. In addition, in the AFM, in order to scan marking parts using a probe, there are cases in which an accurate shape image cannot be acquired due to a dirty probe tip end depending on the states of the marking parts, and thus it is preferable that the marking be formed to be small and shallow to prevent the probe from being contaminated. Next, shape analysis of the marking part of the measurement sample surface is performed using AFM. Since the marked marking parts are concaved, measurement is performed with a viewing angle of 5 μm×5 μm in the AFM such that the marking parts are on the corners of the visual field as possibly. In addition, protrusions on the periphery of the marking part are set as non-measurement targets. Next, measurement is performed with a viewing angle of 10 μm×10 μm, and a part to be targeted is determined, the part to be targeted is matched, and a part in which no marking is present is measure with a viewing angle of 5 μm×5 μm. A measurement conditions for the shape analysis described above is as described below. In a case in which 20 or more particles can be identified in one visual field of the AFM from one measurement sample for each of the first particle and the second particle, one visual field is measured in the AFM. For each of the first particle and the second particle, in a case in which the number of particles identified in one visual field of the AFM does not reach 20, a plurality of (for example, 3 to 5) visual fields are measured from one measurement sample. For each of the first particle and the second particle, 20 points that are identified as particles through a binarization process are secured, and measurement values of the 20 points using the AFM are averaged, and an acquired average value is set as the height of the protrusion. According to the shape analysis described above, information relating to a surface shape, protrusion analysis, and a height distribution of the protrusions can be acquired. FIG. 17 is an example of an image illustrating an example of a surface shape captured using the AFM. FIG. 18 is a diagram illustrating an example of a protrusion analysis result using the AFM. FIG. 19 is a diagram illustrating an example of a height distribution of protrusions. From the acquired information, data such as the number of formed protrusions, heights of protrusions formed using the particles described above, and the like can be acquired.

<AFM Measurement Condition>
   Device: AFM Dimension 3100 microscope (having Nanoscope IV controller) (Digital Instruments, USA)
   Measurement mode: Tapping
   Tapping frequency at time of tuning: 200 to 400 kHz
   Cantilever: SNL-10 (manufactured by Bruker Co.)
   Scan size: 5 μm×5 μm
   Scan rate: 1 Hz
   Scan line: 256

<Method for Calculating Reference Face at Time of Calculating Protrusion Height>

An AFM image is divided into 256×256 (=65,536), a height Z(i) (i: Measurement point number, i=1 to 65,536) is measured at each measurement point, and measured heights (Zi) of the measurement points are simply averaged (arithmetic mean), and an average height (reference face) $Z_{ave}$ (=(Z(1)+Z(2)+ . . . +Z(65,536))/65,536) is acquired.

(Method for Identifying Type of Particle Forming Protrusion Using FE-SEM)

Figure 20:
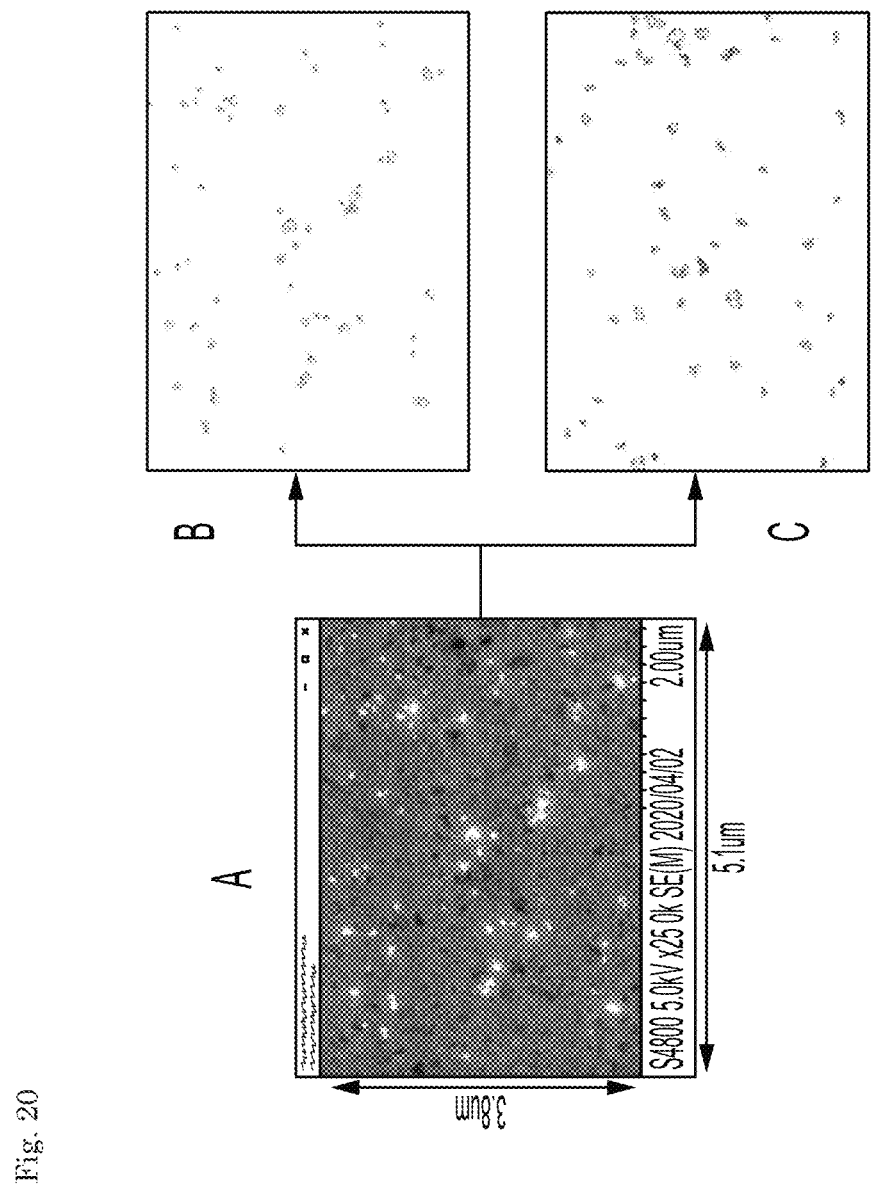
FIG. 20 is an example of an FE-SEM image.

The above-described marking parts of the measurement sample described above are captured under FE-SEM measurement conditions described below using a field radiation-type scanning electronic microscope (FE-SEM), whereby an FE-SEM image is acquired. A diagram A in FIG. 20 is an example of the FE-SEM image. From the acquired FE-SEM image, a type of particles forming protrusions can be identified using a luminance difference according to a difference between secondary electron discharge amounts of the first particle and the second particle. Image processing for this identification will be described below. In addition, positions of protrusions formed in accordance with the first particle and the second particle in the FE-SEM image are identified.

<FE-SEM Measurement Condition>
   Device: HITACHI S-4800 (manufactured by Hitachi High-technologies Corporation)
   Viewing angle: 5.1 μm×3.8 μm
   Acceleration voltage: 5 kV
   Measurement magnification: 25,000 times A binarization process is performed on the acquired FE-SEM image (the diagram A illustrated in FIG. 20) under each of two processing conditions represented below using image processing software Image J. From an image acquired through the binarization process, information of the number of protrusions formed in accordance with each of the first particle and the second particle, an average area per one protrusion, a total area of the protrusions, and a diameter of a protrusion (a Feret diameter) can be acquired. In addition, when the binarization process is performed, for a second particle having high luminance (a white portion in the diagram A of FIG. 20) and a first particle having low luminance (a black portion in the diagram A of FIG. 20), the conditions are changed as represented below.

<Binarization Process Conditions for Acquiring Information Relating to First Particle>
   Software: Image J ver. 1.44p
   Binarization threshold: Threshold (0.65)
   Binarization target size: 0.002 μm to infinity <Binarization Process Conditions for Acquiring Information Relating to Second Particle>
   Software: Image J ver 1.44p
   Binarization threshold: Threshold (220, 255)
   Binarization target size: 0.001 μm to infinity A diagram B of FIG. 20 is an image representing a position distribution of protrusions, which are formed in accordance with second particles (alumina particles), acquired by performing a binarization process on the FE-SEM image of the diagram A of FIG. 20 under the binarization process conditions of the second particles (alumina particles). From the acquired image, the following information relating to the second particles could be acquired.

<Acquired Information Relating to Second Particle>
   Quantity: 58
   Average area: 0.003 μm$^2$
   Total area: 0.198 μm$^2$
   Feret diameter: 0.091 μm A diagram C of FIG. 20 is an image representing a position distribution of protrusions, which are formed in accordance with first particles (carbon black particles), acquired by performing a binarization process on the FE-SEM image of the diagram A of FIG. 20 under the binarization process conditions of the first particles (carbon black particles). From the acquired image, the following information relating to the first particles could be acquired.

<Acquired Information Relating to First Particle>
   Quantity: 55
   Average area: 0.005 μm$^2$
   Total area: 0.262 μm$^2$
   Feret diameter: 0.013 μm (Method for Associating Height of Protrusion and Type of Particle Forming Protrusion)

By overlapping the acquired AFM image and the FE-SEM image before the binarization process with each other, a composite image is acquired. By using the composite image, it is identified whether a particle forming each protrusion is a first particle or a second particle.

Figure 21:
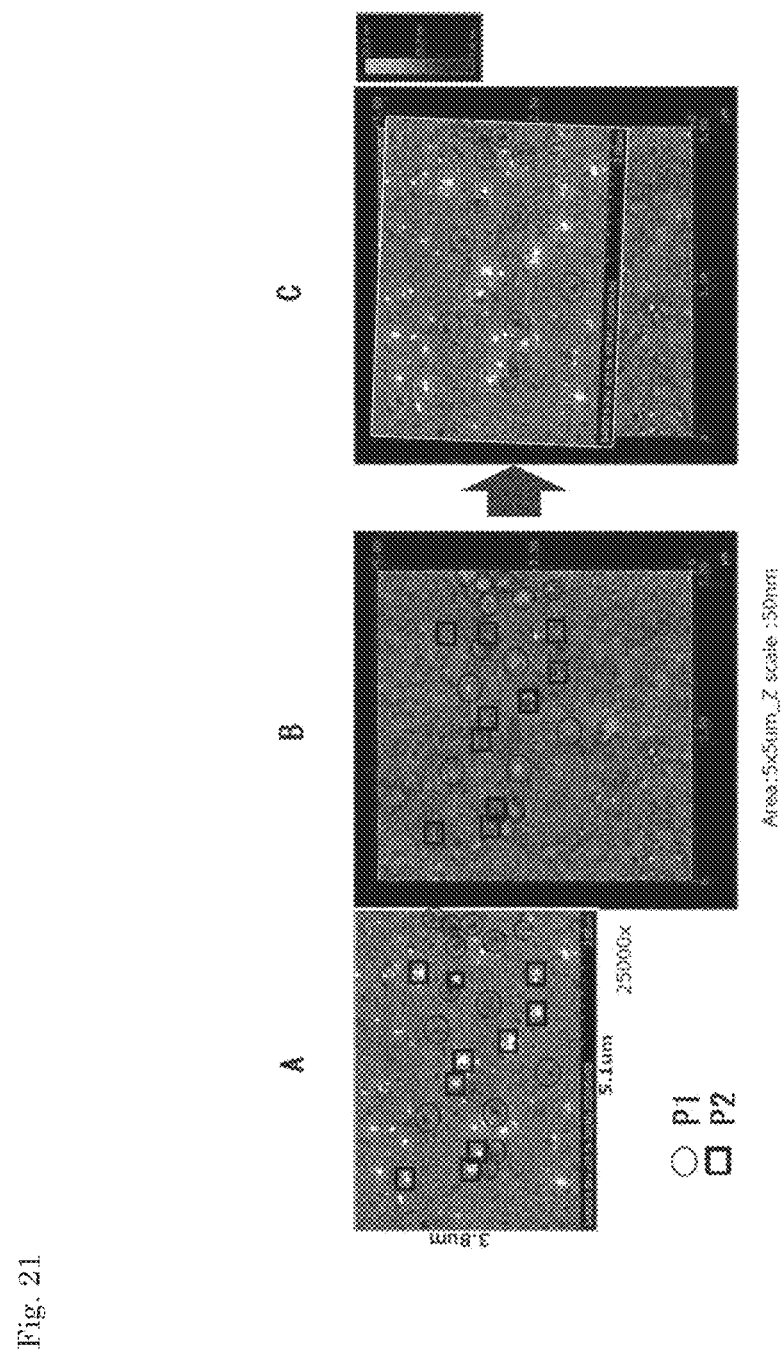
FIG. 21 is a composite image acquired by superimposing an AFM image and an FE-SEM image.

For example, the diagram C of FIG. 21 is a composite image acquired by overlapping the AFM image (the diagram B) and the FE-SEM image (the diagram A) such that the positions of protrusions corresponding to each other coincide with each other. In FIG. 21, different marks are attached to positions such that the positions of protrusions formed in accordance with first particles P1 and positions of protrusions formed in accordance with second particles P2 judged in the binarization process described above, which are present inside the FE-SEM image (the diagram A) before image composition, can be judged. Similarly, different marks are attached to positions such that the positions of protrusions formed in accordance with first particles (carbon black particles) P1 and positions of protrusions formed in accordance with second particles (alumina particles) P2 judged in the binarization process described above, which are present inside the FE-SEM image (the diagram B) before image composition, can be judged. From a composite image acquired by overlapping the AFM image (the diagram B) and the FE-SEM image (the diagram A) such that positions of protrusions corresponding to each other coincide with each other, it is judged from which particle out of the first particle P1 and the second particle P2 each protrusion was formed. In addition, in the case of FIG. 21 (the diagram B), the marking part is measured with a viewing angle of 10 μm×10 μm in the AFM, and thereafter, a part in which there is no marking is measured with a viewing angle of 5 μm×5 μm, and thus no marking is present inside the image.

Next, by using AFM analysis software (Software version 5.12 rev. B for Dimension 3100 manufactured by Veeco co.), a height of each protrusion inside the composite image is measured. For each protrusion, as described above, the type of particle (one of the first particle and the second particle) forming this protrusion is identified, and thus the identified type of particle can be associated with a measured height.

Figure 22:
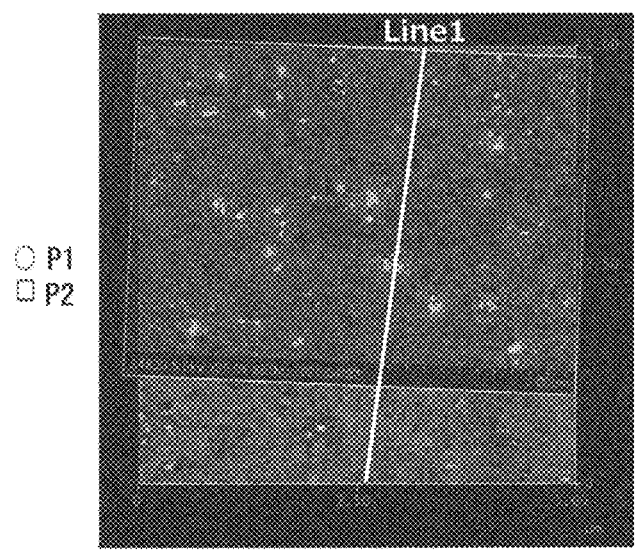
FIG. 22 is an enlarged view of the composite image acquired by superimposing the AFM image and the FE-SEM image.
Figure 23:
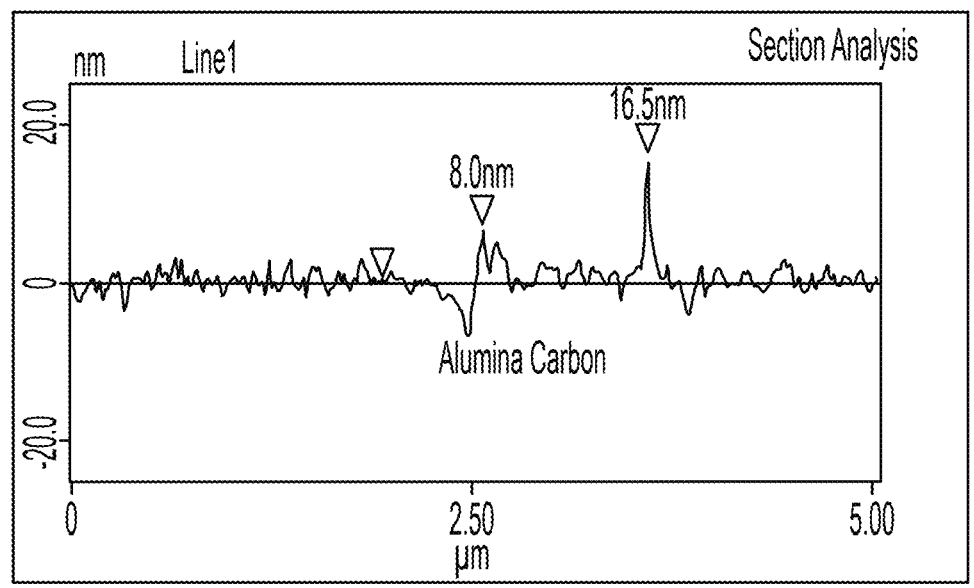
FIG. 23 is a diagram illustrating an example of an analysis result using AFM for line 1 (Line 1) illustrated in FIG. 22.

For example, FIG. 22 is an enlarged view of a composite image acquired by overlapping an AFM image and an FE-SEM image with each other. FIG. 23 is a diagram illustrating an analysis result (a protrusion height measurement result) using AFM for line 1 (Line 1) set at an arbitrary position in FIG. 22. As illustrated in FIG. 23, heights of protrusions formed in accordance with a first particle (a carbon black particle) and a second particle (an alumina particle) present on line 1 can be identified. In this way, from the composite image and the AFM analysis result, the height of each protrusion is identified.

(Average Height of Protrusions, Average Height Ratio of Protrusion, and Ratio of Protrusions Having Height of 10 nm or More)

From the information relating to heights of protrusions acquired as described above, an average height of protrusions formed in accordance with first particles, an average height of protrusions formed in accordance with second particles, an average height ratio of protrusions, and a ratio of protrusions formed in accordance with first particles having heights of 10 nm or more or protrusions formed in accordance with second particles having heights of 10 nm or more are acquired. The average height of protrusions described above and the ratio of protrusions formed in accordance with particles of having heights of 10 nm or more described above, for example, can be acquired from a cumulative frequency distribution of protrusions formed in accordance with respective first particles or second particles.

Figure 24:
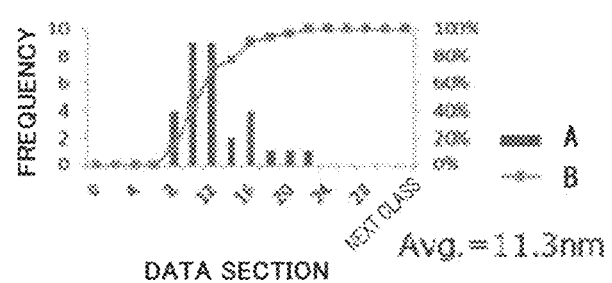
FIG. 24 is a diagram illustrating a cumulative frequency distribution of heights of protrusions formed using first particles (carbon black particles).
Figure 25:
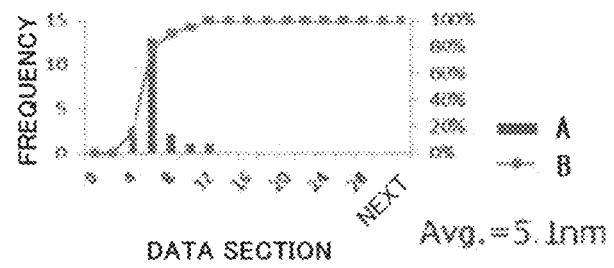
FIG. 25 is a diagram illustrating a cumulative frequency distribution of heights of protrusions formed using second particles (alumina particles).
Figure 26:
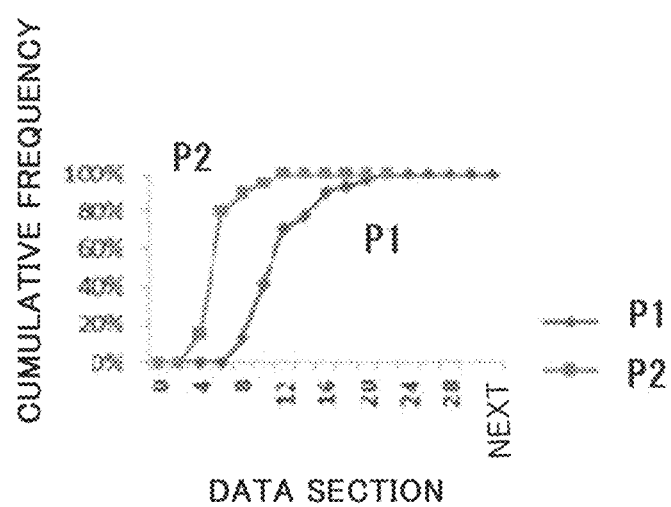
FIG. 26 is a diagram illustrating a cumulative frequency distribution of heights of protrusions formed using first particles (carbon black particles) and a cumulative frequency distribution of heights of protrusions formed using second particles (alumina particles).

For example, FIG. 24 is a diagram illustrating a cumulative frequency distribution of heights of protrusions formed in accordance with first particles (carbon black particles). In FIG. 24, A represents a frequency, and B represents a cumulative %. From FIG. 24, it is represented that an average height of protrusions formed in accordance with first particles (carbon black particles) is 11.3 nm, and a ratio of protrusions having heights of 10 nm or more is 58%. FIG. 25 is a diagram representing a cumulative frequency distribution of heights of protrusions formed in accordance with second particles (alumina particles). In FIG. 25, A represents a frequency, and B represents a cumulative %. From FIG. 25, it is represented that an average height of protrusions formed in accordance with second particles (alumina particles) is 5.1 nm, and a ratio of protrusions having heights of 10 nm or more is 5.9%. From FIGS. 24 and 25, a ratio (the average height of protrusions formed in accordance with first particles/the average height of protrusions formed in accordance with second particles) of the average height of protrusions formed in accordance with first particles (carbon black particles) and the average height of protrusions formed in accordance with second particles (alumina particles) is 2.21. FIG. 26 is a diagram illustrating cumulative frequency distributions of heights of protrusions formed in accordance with first particles (carbon black particles) P1 and heights of protrusions formed in accordance with second particles (alumina particles) P2.

In addition, when heights of protrusions are measured, the numbers of protrusions formed in accordance with the first particles and the second particles, an average area per protrusion, a total area of protrusions, a diameter (a Feret diameter) of a protrusion, a ratio of the first particles forming protrusions of protrusion heights of 10 nm or more, and a ratio of the second particles forming protrusions of protrusion heights of 10 nm or more are measured as well.

(Abrasivity)

Figure 2:
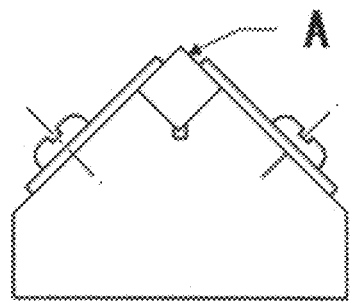
FIG. 2 is a schematic view illustrating a configuration of a jig dedicatedly used for measuring abrasivity.
Figure 3:
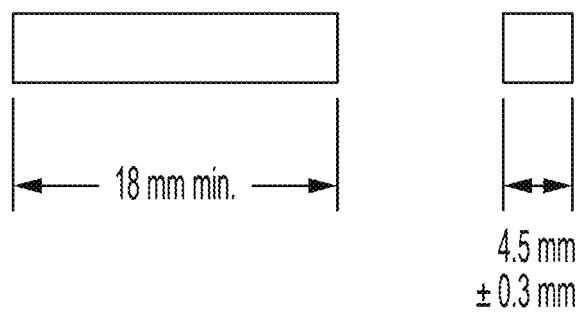
FIG. 3 is a schematic view illustrating an abrasivity bar.
Figure 4:
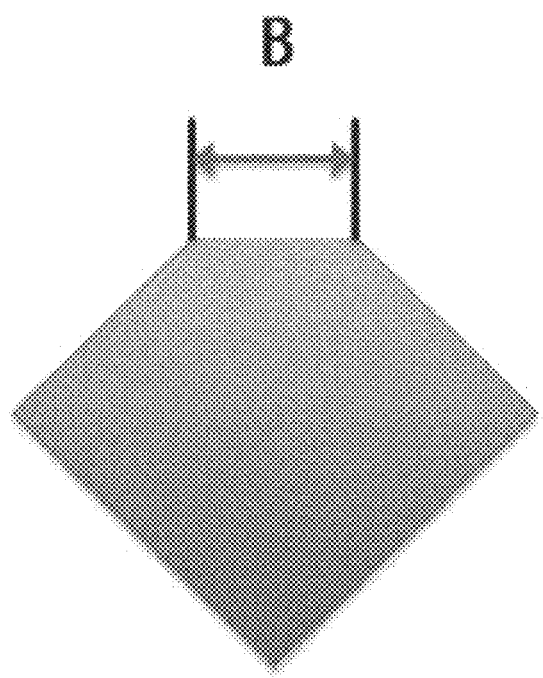
FIG. 4 is a schematic view illustrating a wear amount (a cutting amount) of an abrasivity bar.

The abrasivity is measured in compliance with ECMA-319 Annex C. In addition, the abrasivity is measured by changing a ceramic material of the abrasivity bar to AlTiC. The abrasivity represents an index indicating a degree of wear of a magnetic head according to a magnetic face of a magnetic tape in accordance with the magnetic tape running with being in contact with the magnetic head. For example, a bar (abrasivity bar) A of a rectangular prism produced using the ceramic material (AlTiC) illustrated in FIG. 3 is set in a dedicated jig (a jig described in ECMA-319 Annex C) illustrated in FIG. 2, is mounted in a magnetic head part of a tape drive or the like such that a corner of this rectangular prism is brought into contact with the magnetic tape, the magnetic tape is caused to run for a predetermined time or a predetermined number of passes, and, after running, as illustrated in FIG. 4, a width B of the abrasivity bar that has worn is measured. The measured amount of wear (a cutting amount) of the abrasivity bar is set as an index of the abrasivity. The larger the amount of wear (the cutting amount), the far superior the abrasivity, which represents that the polishing force is larger. For example, the abrasivity is measured as below.

A bar of a rectangular prism (abrasivity bar) A produced using a ceramic material (AlTiC) illustrated in FIG. 3 is set in the dedicated jig illustrated in FIG. 2. Next, the bar is mounted in a magnetic head part of a tape driver or the like such that a corner of the bar of the rectangular prism is brought into contact with the magnetic tape. Thereafter, the magnetic is caused to run under the following conditions.

Tape speed: 3.0 m/second
Tension 1.0 N±0.1 N
Wrap angle: 12°

An average wear pattern length of the abrasivity bar described above after a new magnetic tape being repeatedly caused to run 100 times is preferably 12.5 μm to 20 μm. When measurement is repeated in the same part as the magnetic tape, a wear pattern length is within 30%. The measurement is performed under an environment of temperature 23° C.±2° C. and humidity of 45%±5%. An average wear pattern length of an abrasivity bar of a leader tape after the magnetic tape being caused to repeatedly to run 100 times is within a maximum of 20 μm. After the magnetic tape is caused to repeatedly run 100 times, a wear amount (a cutting amount) is measured. This measured value is defined as abrasivity of 100 passes.

Thereafter, the abrasivity bar is replaced with a new one, and a magnetic tape after being caused to repeatedly run 100 times is used, and, after this magnetic tape is caused to repeatedly run 100 times, a wear amount (a cutting amount) is measured. This measured value is defined as abrasivity of 200 passes.

(Average Thickness (Average Total Thickness) $t_T$ of Magnetic Recording Medium (Magnetic Tape))

An upper limit value of the average thickness (the average total thickness) $t_T$ of the magnetic tape T is preferably 5.2 µm or less, more preferably 5.0 µm or less, further more preferably 4.6 µm or less, and yet further more preferably 4.4 µm or less. In a case in which the average thickness $t_T$ of the magnetic tape T is 5.2 µm or less, a recordable recording capacity of one data cartridge can be higher more than that of a general magnetic tape. A lower limit value of the average thickness $t_T$ of the magnetic tape T is not particularly limited and, for example, is 3.5 µm or more.

The average thickness $t_T$ of a magnetic tape T can be acquired as below. First, the magnetic tape T housed in a cartridge 10A is unwound, and the magnetic tape T is cut out with a length of 250 mm at a position of 30 m in the longitudinal direction from a connection part between the magnetic tape T and the leader tape LT, whereby a sample is produced. Next, by using a laser hologage (LHG-110C) manufactured by Mitutoyo CO. as a measurement device, a thickness of the sample is measured at 5 points, and such measured values are simply averaged (arithmetic mean), whereby the average thickness $t_T$ [µm] is calculated. The measurement positions of the five points described above is assumed to be randomly selected from the sample such that the positions are different positions in the longitudinal direction of the magnetic tape T.

(Average Thickness of Non-Magnetic Layer (Underlayer))

An average thickness of the non-magnetic layer 12 can be acquired as below. First, a magnetic tape T housed in a cartridge 10A is unwound, and the magnetic tape T is cut out with a length of 250 mm at three positions of 10 m, 30 m, and 50 m in the longitudinal direction from a connection part between the magnetic tape T and a leader tape LT, whereby three samples are produced. Subsequently, each sample is processed using an FIB method or the like, whereby slicing is performed. When the FIB method is used, a carbon layer and a tungsten layer are formed as protective films as a pretreatment for observing a TEM image of a cross section to be described below. This carbon layer is formed on the surface of the magnetic layer 13 side and the surface of the back layer 14 side of the magnetic tape T using a deposition method, and this tungsten layer is further formed on the surface of the magnetic layer 13 side using a deposition method or a sputtering method. This slicing is performed along the longitudinal direction of the magnetic tape T. In other words, in accordance with this slicing, a cross section parallel to both the longitudinal direction and the thickness direction of the magnetic tape T is formed.

The cross section of the obtained sliced sample is observed under a transmission electron microscope (TEM) according to the following conditions.

Device: TEM (H9000NAR commercially available from Hitachi, Ltd.)
Acceleration voltage: 300 kV
Magnification: 100,000 times Next, by using the acquired TEM image, the thickness of the non-magnetic layer 12 is measured at positions of at least 10 points or more in the longitudinal direction of the magnetic tape T, and such measured values are simply averaged (an arithmetic mean), and the arithmetic means is set as the average thickness (µm) of the non-magnetic layer 12.

(Average Thickness of Base Layer)

The average thickness of the base layer 11 can be acquired as below. First, a magnetic tape T housed in a magnetic recording cartridge 10A is unwound, and the magnetic tape T is cut out with a length of 250 mm at a position of 30 m in the longitudinal direction from a connection part between the magnetic tape T and a leader tape LT, whereby a sample is produced. In this specification, "longitudinal direction" of a case in which "the longitudinal direction from a connection part between the magnetic tape T and the leader tape LT" represents a direction from one end of the leader tape LT side to the other end on a side opposite thereto.

Subsequently, the other layers other than the base layer 11 of the sample (that is, the non-magnetic layer (underlayer) 12, the magnetic layer 13, and the back layer 14) are removed using a solvent such as methyl ethyl ketone (MEK) or diluted hydrochloric acid. Next, by using a laser hologage (LGH-110C) manufactured by Mitutoyo CO. as a measurement device, a thickness of the sample (the base layer 11) is measured at positions of five points, and, by simply averaging (taking an arithmetic mean thereof) of such measured values, the average thickness of the base layer 11 is calculated. The measurement positions of the five points described above is assumed to be randomly selected from the sample such that the positions are different positions in the longitudinal direction of the magnetic tape T.

(Average Thickness $t_b$ of Back Layer)

An upper limit value of the average thickness of the back layer 14 is preferably 0.6 µm or less. When the upper limit value of the average thickness of the back layer 14 is 0.6 µm or less, also in a case in which the average thickness of the magnetic tape T is 5.6 µm or less, the thicknesses of the non-magnetic layer (the underlayer) 12 and the base layer 11 can be maintained thick, and thus the running stability of the magnetic tape T inside a recording and reproducing device can be maintained. A lower limit value of an average thickness of the back layer 14 is not particularly limited, but is, for example, 0.2 µm or more.

The average thickness $t_b$ of the back layer 14 can be acquired as below. First, an average thickness (an average total thickness) $t_T$ of the magnetic tape T is measured. A method for measuring the average thickness $t_T$ (the average total thickness) is as described in the following "Average thickness of magnetic tape". Subsequently, the magnetic tape T housed in a cartridge 10A is unwound, and the magnetic tape T is cut out with a length of 250 mm at a position of 30 m in the longitudinal direction from a connection part between the magnetic tape T and the leader tape LT, whereby a sample is produced. Next, the back layer 14 of the sample is removed using a solvent such as methyl ethyl ketone (MEK) or diluted hydrochloric acid. Next, by using a laser hologage (LGH-110C) manufactured by Mitutoyo Co., a thickness of the sample is measured at positions of five points, and, by simply averaging (taking an arithmetic mean thereof) of such measured values, the average value $t_B$ [µm] is calculated. Then, the average thickness $t_b$ [µm] of the back layer 14 is obtained from the following formula. The measurement positions of the five points described above is assumed to be randomly selected from the sample such that the positions are different positions in the longitudinal direction of the magnetic tape T.

$$t_b[\mu m]=t_T[\mu m]-t_B[\mu m]$$

(Average Thickness $t_m$ of Magnetic Layer)

The average thickness $t_m$ of the magnetic layer 13 is obtained as follows. First, a magnetic tape T housed in a cartridge 10A is unwound, and the magnetic tape T is cut out with a length of 250 mm at three positions of 10 m, 30 m, and 50 m in the longitudinal direction from a connection part between the magnetic tape T and a leader tape LT, whereby three samples are produced. Subsequently, each sample is processed using an FIB method or the like, whereby slicing is performed. When the FIB method is used, a carbon layer and a tungsten layer are formed as protective films as a pretreatment for observing a TEM image of a cross section to be described below. This carbon layer is formed on the surface of the magnetic layer 13 side and the surface of the back layer 14 side of the magnetic tape T using a deposition method, and this tungsten layer is further formed on the surface of the magnetic layer 13 side using a deposition method or a sputtering method. This slicing is performed along the longitudinal direction of the magnetic tape T. In other words, in accordance with this slicing, a cross section parallel to both the longitudinal direction and the thickness direction of the magnetic tape T is formed.

The cross section of the obtained sliced sample is observed under a transmission electron microscope (TEM) according to the following conditions to obtain a TEM image. Here, the magnification and the acceleration voltage may be appropriately adjusted according to the type of the device.

Device: TEM (H9000NAR commercially available from Hitachi, Ltd.)
Acceleration voltage: 300 kV
Magnification: 100,000 times Next, by using a TEM image of each sliced sample that has been acquired, the thickness of the magnetic layer 13 is measured at positions of 10 points of each sliced sample. The measurement positions of 10 points of each sliced sample are randomly selected from the sample such that the measurement positions are different positions in the longitudinal direction of the magnetic tape T. An average value acquired by simply averaging (taking an arithmetic mean of) the acquired measured values (thicknesses of the magnetic layer 13 of 30 points as a total) of respective sliced samples is set as the average thickness $t_m$ [nm] of the magnetic layer 13.

[Standard Deviation σPES of PES Value]

A standard deviation σPES of the PES value of the magnetic recording medium 10 according to the present technology is preferably within a 40 FV number, and σPES may be 50 nm or less, preferably 40 nm or less, more preferably 30 nm or less, and further more preferably 25 nm or less.

A position error signal (PES) represents an amount of deviation (error) of a reading position of a servo pattern in the width direction of the magnetic recording medium 10 at the time of reproducing (reading) the servo pattern using the recording and reproducing device 30. In order to perform adjustment of tension of the longitudinal direction of the magnetic recording medium 10 with high accuracy, it is preferable that the linearity of a servo band at the time of a servo pattern being read by the recording and reproducing device 30 be as high as possible, in other words, the standard deviation σPES of the PES value representing an amount of deviation of the reading position described above is as low as possible. The standard deviation σPES of the PES value of the magnetic recording medium 10 according to the present technology has a low value as described above, and thus, the linearity of the servo band is high, and tension adjustment can be performed with high accuracy.

Figure 14:
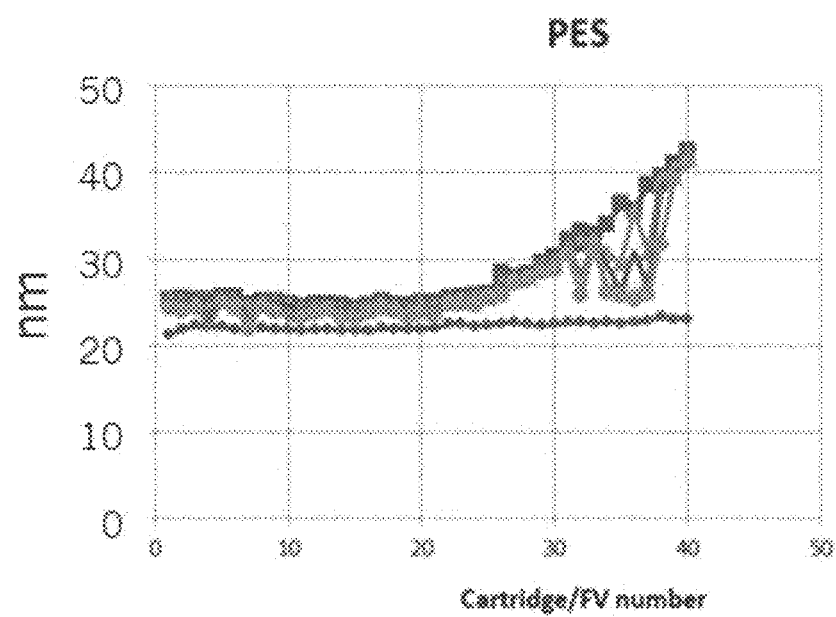
FIG. 14 is a diagram illustrating changes of the standard deviation σPES over time.
Figure 15:
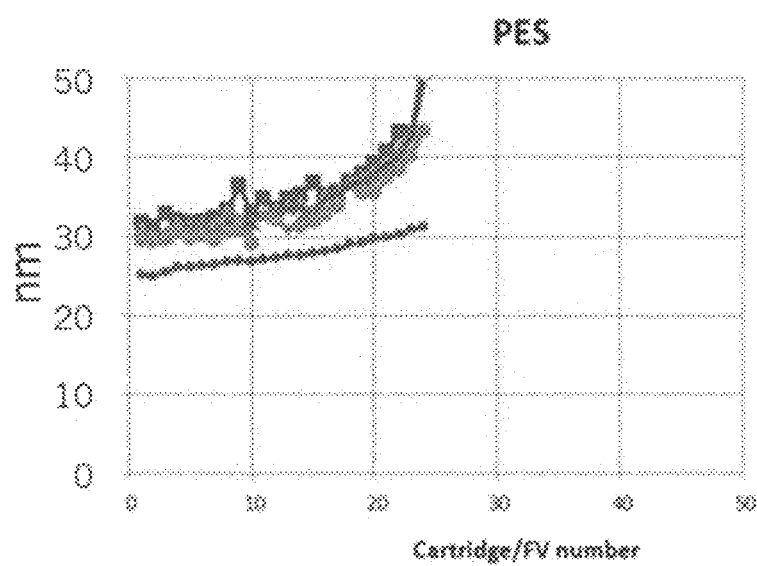
FIG. 15 is a diagram illustrating changes of the standard deviation σPES over time.

FIG. 14 is a diagram illustrating changes of the standard deviation σPES of the PES value over time in accordance with running of a magnetic tape. As illustrated in FIG. 14, within 40 FV number, when σPES is less than 50 nm, a track deviation does not occur. FIG. 15 is a diagram illustrating changes of the standard deviation σPES over time in accordance with running of a magnetic tape. As illustrated in FIG. 15, when σPES exceeds 50 nm within 40 FV number, a track deviation occurs many times, and thus the running of the magnetic tape stops.

Figure 13:
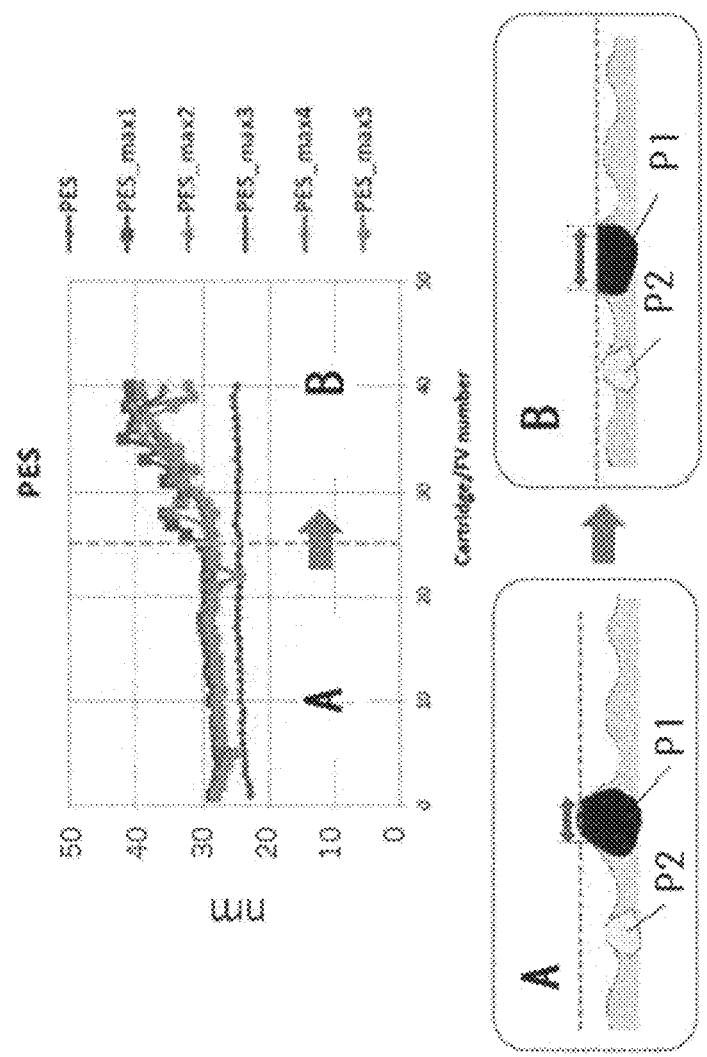
FIG. 13 represents a diagram illustrating changes of a standard deviation σPES over time and a cross-sectional view schematically illustrating changes of an appearance of a protrusion formed using a carbon particle on a surface of a magnetic layer.

In FIG. 13, an upper diagram is a diagram illustrating changes of the standard deviation σPES over time in accordance with running of a magnetic tape. In FIG. 13, a lower left diagram is a cross-sectional view schematically illustrating a relation between a protrusion formed on the magnetic layer surface in accordance with a first particle (carbon particle) P1, a protrusion formed on the magnetic layer surface in accordance with a second particle (alumina particle) P2, and a magnetic head in an area A (friction stability) in which σPES illustrated in the upper diagram described above has an almost constant value. In the drawing, a broken line is a virtual line representing contact between the protrusion formed in accordance with the first particle (carbon particle) P1 and the magnetic head surface. In FIG. 13, a lower right diagram is a cross-sectional view schematically illustrating a relation between a protrusion formed on the magnetic layer surface in accordance with a first particle (carbon particle) P1, a protrusion formed on the magnetic layer surface in accordance with a second particle (alumina particle) P2, and a magnetic head in an area B (friction rise) in which σPES illustrated in the upper diagram described above tends to increase. In the drawing, a broken line is a virtual line representing contact between a protrusion formed in accordance with the first particle (carbon particle) P1 and the magnetic head surface.

Figure 16:
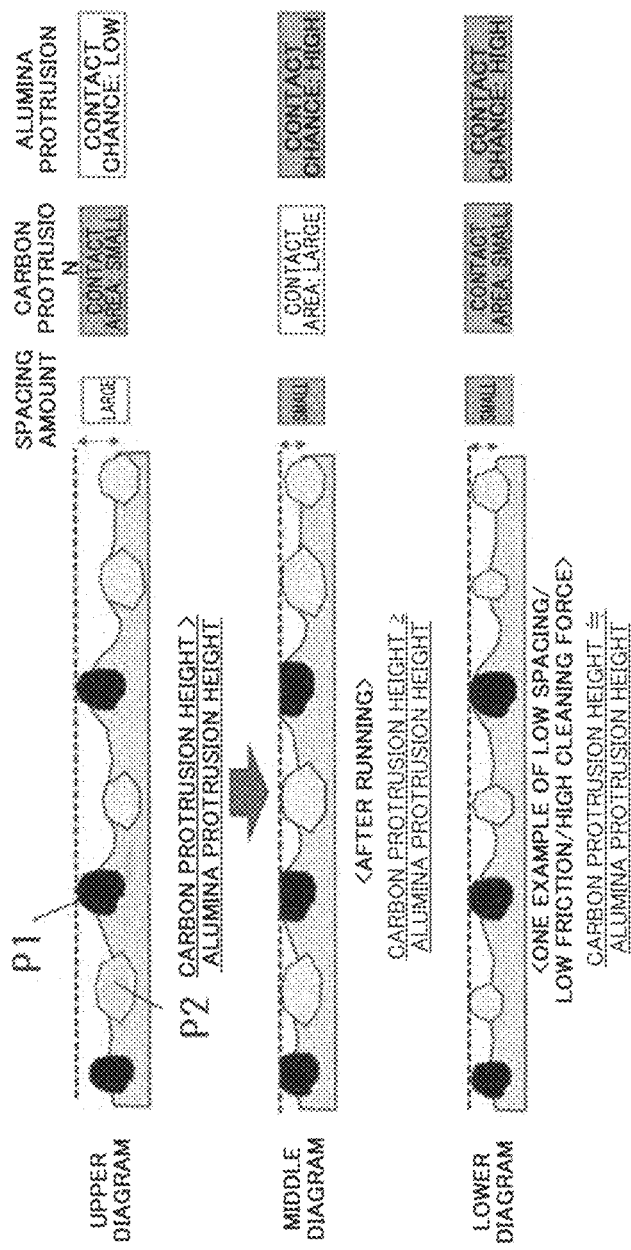
FIG. 16 is a diagram schematically illustrating a relation between protrusions formed in accordance with a first particle (carbon particle) P1 and a second particle (alumina particle) and a magnetic head.

As illustrated in FIG. 13, the reason for the standard deviation σPES being almost constant in the area A and the standard deviation σPES rising in the area B is estimated such that while, in the area A, a contact area between the protrusion formed in accordance with the first particle (carbon particle) P1 and the magnetic head surface is small, and the friction is constant, in the area B, in accordance with running of the magnetic tape, the first particle (carbon particle) P1 is worn by the magnetic tape, the protrusion formed in accordance with the first particle (carbon particle) P1 gradually collapses, and a contact area between the protrusion formed in accordance with the first particle (carbon particle) P1 and the magnetic head surface becomes large, and the friction rises. FIG. 16 is a cross-sectional view schematically illustrating a relation between a protrusion formed in accordance with a first particle (carbon particle) P1 and a protrusion formed in accordance with a second particle (alumina particle) P2 and a magnetic head on a magnetic layer surface. In FIG. 16, a broken line is a virtual line illustrating contact between the protrusion formed in accordance with the first particle (carbon particle) P1 and the magnetic head surface on the magnetic layer surface. In FIG. 16, an upper diagram is a diagram schematically illustrating a relation between protrusions formed in accordance with the first particle (carbon particle) P1 and the second particle (alumina particle) P2 and the magnetic head before running of the magnetic tape. As illustrated in the upper diagram in FIG. 16, before running of the magnetic tape, it is assumed that a height of the protrusion formed in accordance with the first particle (carbon particle) P1 is larger than a height of the protrusion formed in accordance with the second particle (alumina particle) P2, a spacing amount between the magnetic head and the magnetic tape becomes large, a contact area between the protrusion formed in accordance with the first particle (carbon particle) P1 and the magnetic head is small, and the chance for contact between the protrusion formed in accordance with the second particle (alumina particle) P2 and the magnetic head is low. In FIG. 16, a middle diagram is a diagram schematically illustrating a relation between protrusions formed in accordance with the first particle (carbon particle) P1 and the second particle (alumina particle) P2 and the magnetic head after running of the magnetic tape. As illustrated in the middle diagram in FIG. 16, after running of the magnetic tape, it is assumed that a protrusion formed in accordance with the first particle (carbon particle) P1 is gradually shaved in accordance with contact the magnetic tape, a height of the protrusion formed in accordance with the first particle (carbon particle) P1 becomes larger than or the same as a height of the protrusion formed in accordance with the second particle (alumina particle) P2, a spacing amount between the magnetic head and the magnetic tape becomes small, a contact area between the protrusion formed in accordance with the first particle (carbon particle) P1 and the magnetic head becomes large, and the chance for contact between the protrusion formed in accordance with the second particle (alumina particle) P2 and the magnetic head become high. In FIG. 16, a lower diagram is a diagram schematically illustrating a relation between protrusions formed in accordance with a first particle (carbon particle) P1 and a second particle (alumina particle) P2 of a magnetic tape corresponding to a magnetic recording medium according to the present technology and a magnetic head. As illustrated in the lower diagram in FIG. 16, it is assumed that, by identifying a relation between heights of protrusions formed in accordance with a first particle (carbon particle) P1 and a second particle (alumina particle) P2 and identifying the height of the first particle (carbon particle) P1 or the second particle (alumina particle) P2 and decreasing a spacing amount between a magnetic head and a magnetic tape, a contact area between the protrusion formed in accordance with the first particle (carbon particle) P1 and the magnetic head becomes small, the chance for contact between the protrusion formed in accordance with the second particle (alumina particle) P2 and the magnetic head becomes high, and a rise of the standard deviation σPES according to running of the magnetic tape is inhibited.

Hereinafter, a method for measuring the standard deviation σPES will be described with reference to FIGS. 10 and 11.

In order to acquire the standard deviation σPES, a PES value is measured. In order to measure the PES value, for example, a head unit 300 for PES measurement illustrated in FIG. 11 is prepared. As the head unit 300, an LTO2 head (a head that is in compliance with LTO2 standards) manufactured by Hewlett Packard Enterprise (HPE) Corp. is used. The head unit 300 includes two head parts 300A and 300B disposed to be aligned in the longitudinal direction of the magnetic recording medium 10. Each head part includes a plurality of recording heads 340 used for recording a data signal in a magnetic recording medium 10, a plurality of reproducing heads 350 for reproducing a data signal recorded in a magnetic recording medium 10, and a plurality of servo heads 320 used for reproducing a servo signal recorded in a magnetic recording medium 10. In addition, in a case in which the head unit 300 is used only for measuring a PES value, the recording heads 340 and the reproducing heads 350 may not be included in the head unit.

First, by using the head unit 300, a servo pattern of a predetermined servo band disposed in the magnetic recording medium 10 is reproduced (read). At this time, for each servo pattern of a predetermined servo band, the servo heads 320 of the head part 300A and the servo heads 320 of the head part 300B sequentially face each other, and reproduction of this servo pattern is sequentially performed using these two servo heads 320. At this time, a part of the servo pattern recorded in the magnetic recording medium 10 that faces the servo heads 320 is read and is output as a servo signal.

Figure 10:
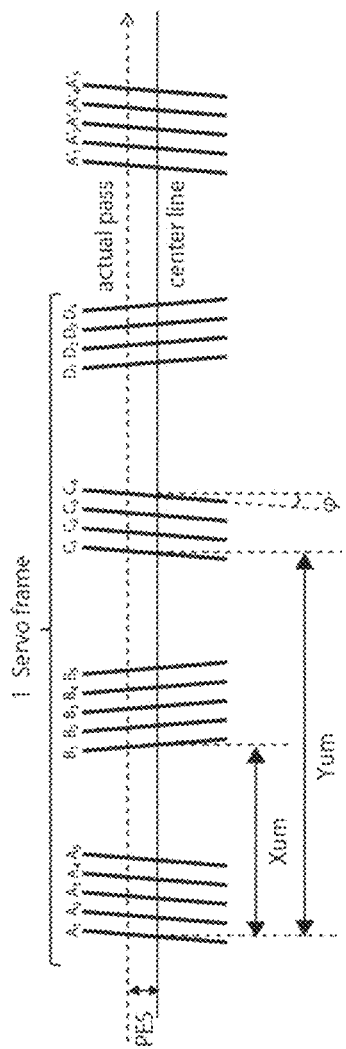
FIG. 10 is a diagram illustrating an example of a servo pattern in a servo band.
Figure 11:
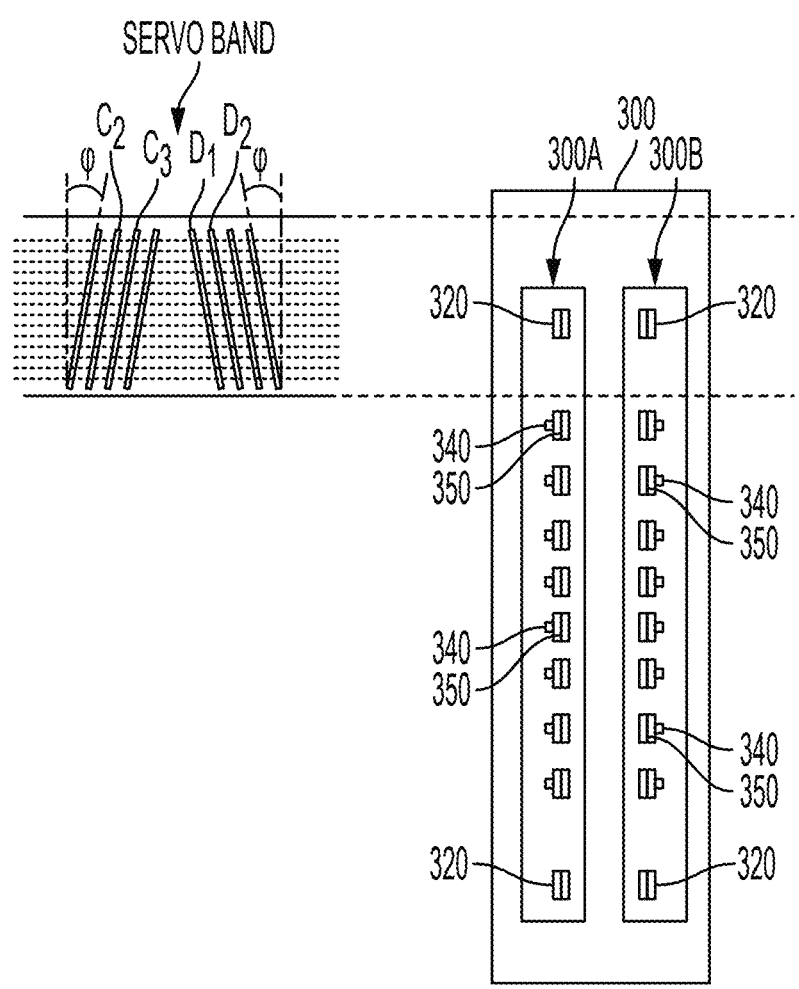
FIG. 11 is a diagram for describing a method for measuring PES.

As illustrated in FIG. 10, a value of the PES value for each head part is calculated using the following calculation expression for each servo frame.

$$PES[um] = \frac{\begin{bmatrix}(B_{a1} - A_{a1}) + (B_{a2} - A_{a2}) + \\ (B_{a3} - A_{a3}) + (B_{a4} - A_{a4}) + \\ (D_{a1} - C_{a1}) + (D_{a2} - C_{a2}) + \\ X[um] - \frac{(D_{a3} - C_{a3}) + (D_{a4} - C_{a4})}{(C_{a1} - A_{a1}) + (C_{a2} - A_{a2}) +} \times Y[um] \\ (C_{a3} - A_{a3}) + (C_{a4} - A_{a4}) + \\ (A'_{a1} - C_{a1}) + (A'_{a2} - C_{a2}) + \\ (A'_{a3} - C_{a3}) + (A'_{a4} - C_{a4}) \end{bmatrix}}{2 \times \tan\varphi}$$

[Math. 1]

Here, a center line illustrated in FIG. 10 is a center line of a servo band. X [μm] is a distance between a servo pattern A1 and a servo pattern B1 on the center line illustrated in FIG. 10. Y [μm] is a distance between the servo pattern A1 and a servo pattern C1 on the center line illustrated in FIG. 10. X and Y can be acquired by developing the magnetic recording medium 10 using a ferricolloid developing solution and using a universal measuring microscope (TOPCON TUM-220ES) and a data processing device (TOPCON CA-1B). In an arbitrary position in the tape longitudinal direction, 50 servo frames are selected, X and Y in each servo frame are acquired, and simple averages of 50 pieces of data are set as X and Y used in the calculation expression described above.

The difference (Ba1−Aa1) described above represents a time [sec] in an actual pass between two servo patterns B1 and A1 corresponding to each other. Similarly, a term of another difference represents a time [sec] in an actual pass between two servo patterns corresponding to each other. Such a time is acquired from a time between timing signals acquired from a waveform of a servo signal and a tape running speed. In this specification, an actual pass represents positions through which a servo signal reading head actually runs on a servo signal.

φ is an azimuth angle. φ can be acquired by developing the magnetic recording medium 10 using a ferricolloid developing solution and using a universal measuring microscope (TOPCON TUM-220ES) and a data processing device (TOPCON CA-1B).

In the present technology, the standard deviation σPES of the PES value is calculated using a servo signal in which a motion of a horizontal direction of the tape is corrected. In addition, in the servo signal a high pass filter process is performed for reflecting a followability of the head. In the present technology, the standard deviation σPES can be acquired using a signal acquired by performing the correction described above and the high pass filter process described above on the servo signal and is so-called Written in PESσ. Hereinafter, a method for measuring the standard deviation σPES of the PES value will be described.

Figure 12:
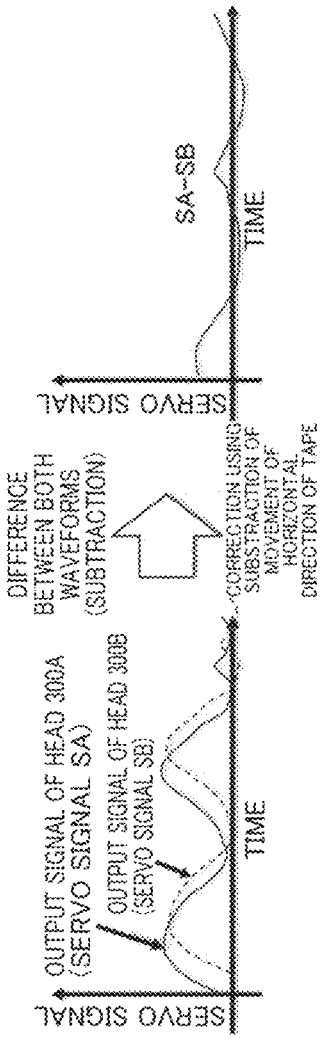
FIG. 12 is a diagram for describing correction of movement of a tape in a width direction.

First, for a range corresponding to an arbitrary 1 m of a data recording area of the magnetic recording medium 10, a servo signal is read using the head 300. By performing subtraction of signals acquired by the head parts 300A and 300B as illustrated in FIG. 12, a servo signal in which a motion of the horizontal direction of the tape has been corrected can be acquired. Then, the high pass filter process is performed on this corrected servo signal. Actually, when the magnetic recording medium 10 is caused to run using a drive, a recording and reproducing head mounted in this drive is moved in the direction of the width of the magnetic recording medium 10 to follow the servo signal by an actuator. Written in PESσ is a noise value after addition of the followability of the width direction of this head, and thus the high pass filter process is necessary. Thus, a high pass filter is not particularly limited and needs to be a function capable of reproducing the followability of the width direction of the drive head. By using a signal acquired through this high pass filter process, a value of PES is calculated using the calculation expression described above for each servo frame. A standard deviation (Written in PESσ) of the value of the PES calculated over 1 m described above is a standard deviation σPES of the PES value according to the present technology.

(Average Particle Size of Magnetic Powder)

In a case in which the magnetic powders include powders of hexagonal ferrite particles, an average particle size and an average aspect ratio of the magnetic powders can be acquired as below. First, a magnetic tape T housed in the cartridge 10A is unwound, and the magnetic tape T is cut out at a position of 30 m in the longitudinal direction from a connection part between the magnetic tape T and the leader tape LT. Subsequently, the magnetic tape T that is a measurement target is processed using an FIB method or the like, whereby slicing is performed. In a case in which the FIB method is used, as pre-processing for observing a TEM image of a cross-section to be described below, a carbon layer and a tungsten layer are formed as protective films. This carbon layer is formed on the surface of the magnetic layer 13 side of the magnetic tape T and the surface of the back layer 14 side using a deposition method, and this tungsten layer is further formed on the surface of the magnetic layer 13 side using a deposition method or a sputtering method. This slicing is performed along the longitudinal direction (a long-side direction) of the magnetic tape T. In other words, in accordance with this slicing, a cross-section that is parallel to both a longitudinal direction and a thickness direction of the magnetic tape T is formed.

The above-described cross-section of an acquired sliced sample is observed using a transmission electronic microscope (H-9500 manufactured by Hitachi High Technologies Inc.) with an acceleration voltage: 200 kV and total magnification: 500,000 times such that the whole magnetic layer 13 is included in the thickness direction of the magnetic layer 13, whereby a TEM photograph is taken. TEM photographs from which 50 particles enabling measurement of a plate diameter DB and the plate thickness DA (see FIG. 27) to be represented below can be extracted are prepared.

Figure 27:
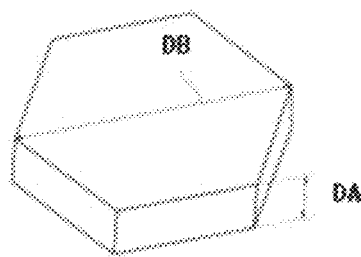
FIG. 27 is a diagram illustrating an example of a shape of a particle of magnetic powder.

In this specification, as illustrated in FIG. 27, in a case in which the shape of a particle observed in the TEM photograph is a plate shape or a pole shape (here, a thickness or a height is smaller than a long diameter of a plate face or a bottom face), as the size of a particle of hexagonal ferrite (hereinafter, referred to as a "particle size"), the long diameter of the plate shape or the bottom face is set as the value of the plate diameter DB. A thickness or a height of a particle observed in the TEM photograph described above is set as the value of the plate thickness DA. In a case in which the plate face or the bottom face of a particle observed in the TEM photograph has a hexagonal shape, the long diameter represents a longest diagonal distance. In a case in which a thickness or a height of a particle is not constant in one particle, a maximum thickness or height of the particle is set as a plate thickness DA.

Next, 50 particles extracted from the captured TEM photographs are selected on the basis of the following criteria. A particle of which a part goes beyond a visual field of the TEM photograph is not measured, and a particle, of which a contour is clear, that is present with being isolated is measured. In a case in which particles overlap each other, although particles of which a boundary is clear and whole shapes of the particles can be judged as well are measured with each of the particles set as independent particles, particles of which a boundary is not clear and the whole shapes of the particles cannot be judged are not measured as particles of which shapes cannot be judged.

Figure 28:
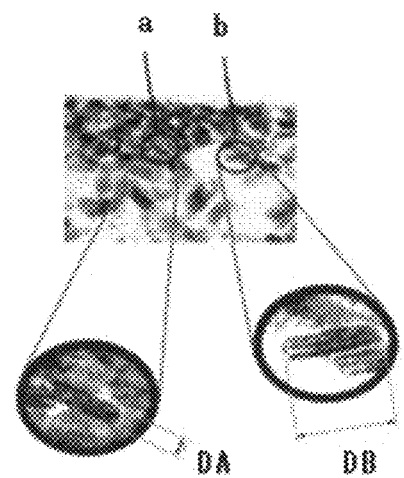
FIG. 28 is an example of a TEM photograph of a sample cross-section.
Figure 29:
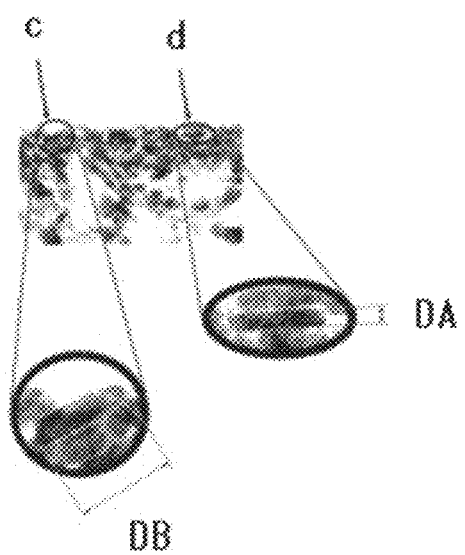
FIG. 29 is another example of a TEM photograph of a sample cross-section.

In FIGS. 28 and 29, one example of a TEM photograph is illustrated. In FIGS. 28 and 29, for example, particles denoted by arrows a and d have plate thicknesses DA of the particles (thicknesses or heights of the particles) that can be clearly checked and thus are selected. A plate thickness DA of each of the selected 50 particles is measured. By simply averaging (taking an arithmetic mean of) plate thicknesses DA acquired in this way, an average plate thickness $DA_{ave}$ is acquired. The average plate thickness $DA_{ave}$ is an average particle plate thickness. Subsequently, a plate diameter DB of each magnetic powder is measured. In order to measure plate diameters DB of particles, 50 particles of which plate diameters DB of the particles can be clearly checked are selected from the captured TEM photograph. For example, in FIGS. 28 and 29, for example, particles denoted by arrows b and c have plate diameters DB that can be clearly checked and thus are selected. A plate diameter DB of each of the selected 50 particles is measured. By simply averaging (taking an arithmetic mean of) plate diameters DB acquired in this way, an average plate diameter $DB_{ave}$ is acquired. The average plate diameter $DB_{ave}$ is an average particle size. Then, an average aspect ratio ($DB_{ave}/DA_{ave}$) is acquired from the average plate thickness $DA_{ave}$ and the average plate diameter $DB_{ave}$.

(Average Particle Volume of Magnetic Powder)

The average particle volume of the magnetic powder is obtained as follows. First, as described with respect to the above-described method for calculating the average particle size of the magnetic powder, an average plate thickness $DA_{ave}$ and an average plate diameter $DB_{ave}$ are obtained. Next, an average particle volume V of a magnetic powder is obtained by the following formula.

$$V = \frac{3\sqrt{3}}{8} \times DA_{ave} \times DB_{ave} \times DB_{ave} \qquad \text{[Math. 2]}$$

(Squareness Ratio Rs2 in Vertical Direction)

A squareness ratio Rs2 in the vertical direction (thickness direction) of the magnetic recording medium according to the present technology may be preferably 65% or more, more preferably 67% or more, and further more preferably 70% or more. When the squareness ratio Rs2 is 65% or more, the vertical orientation of the magnetic powders is sufficiently improved, and thus a far superior SNR can be acquired. Thus, far superior electromagnetic conversion characteristics can be acquired. In addition, a servo signal shape is improved, and control of the drive side can be easily performed.

In this specification, a magnetic recording medium being vertically oriented may represent that the squareness ratio Rs2 of the magnetic recording medium is in the numerical range described above (for example, 65% or more).

The squareness ratio Rs2 in the vertical direction can be acquired as follows. First, a magnetic tape T housed in a magnetic recording cartridge 10A is unwound, and the magnetic tape T is cut out with a length of 250 mm at a position of 30 m in the longitudinal direction from a connection part between the magnetic tape T and the leader tape LT, whereby a sample is produced. After this sample is punched at 6.25 mm×64 mm, a measurement sample of 6.25 nm×8 nm is produced by being folded in three. Then, an M-H hysteresis loop of the measurement sample (the whole magnetic tape T) corresponding to a vertical direction (thickness direction) of the magnetic tape T is measured using a VSM. Next, by using acetone, ethanol, or the like, coating films (the underlayer 12, the magnetic layer 13, the back layer 14, and the like) are wiped, and only the base layer 11 remains. Then, the acquired base layer 11 is punched at 6.25 mm×64 nm and then is regarded as a sample for background correction (hereinafter, simply referred to as a "correction sample") of 6.25 mm×8 mm by being folded in three. Thereafter, an M-H hysteresis loop of the correction sample (the base layer 11) corresponding to the vertical direction of the base layer 11 (the vertical direction of the magnetic recording medium 10) is measured using the VSM.

In measuring the M-H hysteresis loop of the measurement sample (the whole magnetic tape T) and the M-H hysteresis loop of the correction sample (the base layer 11), a high-sensitivity vibration sample-type magnetometer "VSM-P7-15 type" manufactured by Toei Industry Co., Ltd. is used. The measurement conditions are assumed as follows . . . . Measurement mode: Full loop Maximum magnetic field: 15 KOe Magnetic system: 40 bits Time constant of Locking amp: 0.3 sec Waiting time: 1 sec MH average number: 20

After the M-H hysteresis loop of the measurement sample (the whole magnetic tape T) and the M-H hysteresis loop of the correction sample (the base layer 11), are acquired, by subtracting the M-H hysteresis loop of the correction sample (the base layer 11) from the M-H hysteresis loop of the measurement sample (the whole magnetic tape T), background correction is performed, and an M-H hysteresis loop after the background correction can be acquired. A measurement/analysis program bundled in "Type VSM-P7-15" is used for calculating this background correction.

A saturation magnetization Ms (emu) and a residual magnetization Mr (emu) of the obtained M-H hysteresis loop after background correction are substituted into the following formula, and the squareness ratio Rs2 (%) is calculated. Here, all the above-described M-H hysteresis loops are measured at 25° C. In addition, "diamagnetic field correction" when the M-H hysteresis loop is measured in the vertical direction of the magnetic tape T is not measured. Here, for this calculation, a measurement/analysis program bundled in "Type VSM-P7-15" is used.

squareness ratio $Rs2(\%)=(Mr/Ms)\times 100$

(4) Method for Manufacturing Magnetic Recording Medium

Next, a method for manufacturing the magnetic recording medium 10 having the configuration described above will be described. First, by kneading and/or dispersing non-magnetic powders, a binding agent, and the like in a solvent, a coating material for forming a non-magnetic layer (underlayer) is prepared. Next, by kneading and/or dispersing magnetic powders, a binding agent, and the like in a solvent, a coating material for forming a magnetic layer is prepared. In preparation of the coating material for forming a magnetic layer and the coating material for forming a non-magnetic layer (underlayer), for example, a solvent, a dispersion device, and a kneading device described below can be used.

Examples of solvents used to prepare the above-described coating materials include the followings: for example, ketone-based solvents such as acetone, methyl ethyl ketone, methyl isobutyl ketone and cyclohexanone; for example, alcohol-based solvents such as methanol, ethanol and propanol; For example, ester-based solvents such as methyl acetate, ethyl acetate, butyl acetate, propyl acetate, ethyl lactate and ethylene glycol acetate; ether-based solvents such as diethylene glycol dimethyl ether, 2-ethoxyethanol, tetrahydrofuran and dioxane; aromatic hydrocarbon-based solvents such as benzene, toluene and xylene; and halogenated hydrocarbon-based solvents such as methylene chloride, ethylene chloride, carbon tetrachloride, chloroform, and chlorobenzene, and the like. Among them, one may be used, or a mixed material of two or more may be used.

As the kneading device used in preparation of the coating material described above, for example, a kneading device such as a continuous biaxial kneader, a continuous biaxial kneader capable of performing dilution in multiple stages, a kneader, a pressurizing kneader, a roll kneader, or the like can be used and is not particularly limited to such devices. In addition, as the dispersion device used in preparation of the coating material described above, for example, a dispersion device such as a roll mill, a ball mill, a horizontal sand mill, a vertical sand mill, a spike mill, a pin mill, a tower mill, a pearl mill (for example, a "DCP mill" manufactured by Erich), a homogenizer, an ultrasonic disperser, or the like can be used and is not particularly limited to such devices.

Next, by coating one principal face of the base layer 11 with the coating material for forming a non-magnetic layer (underlayer) and drying the coating material, the non-magnetic layer 12 is formed. Subsequently, by coating this non-magnetic layer 12 with the coating material for forming a magnetic layer and drying the coating material, the magnetic layer 13 is formed on the non-magnetic layer 12. In addition, at the time of drying, for example, by using a solenoid coil, magnetic powders are magnetic-field oriented in a thickness direction of the base layer 11. In addition, at the time of drying, for example, by using a solenoid coil, after magnetic powders are magnetic-field oriented in the running direction (a longitudinal direction) of the base layer 11, the magnetic powders may be magnetic-field oriented in the thickness direction of the base layer 11. By performing such a magnetic-field orientation process, a ratio Hc2/Hc1 between a holding force "Hc1" of the vertical direction and the holding force "Hc2" of the longitudinal direction can be maintained to be low, and thus a degree of vertical orientation of magnetic powders can be improved. After forming the magnetic layer 13, a back layer 14 is formed on the other principal face of the base layer 11. In accordance with this, the magnetic recording medium 10 can be acquired.

This ratio Hc2/Hc1 is set to a desired value, for example, by adjusting an intensity of a magnetic field applied to the coating film of a magnetic layer forming coating material, a density of a solid content in the magnetic layer forming coating material, and drying conditions (a drying temperature and a drying time) of the coating film of the magnetic layer forming coating material. It is preferable that the intensity of the magnetic field applied to the coating film be twice or more and three times or less of the holding force of magnetic powders. In order to further raise the ratio Hc2/Hc1, it is also preferable to magnetize magnetic powders in a stage before a magnetic layer forming coating material is inserted into an orientation device used for orienting the magnetic powders using a magnetic field. In addition, as the method for adjusting the ratio Hc2/Hc1, a single method may be used, or two or more methods may be combined and used.

Thereafter, the acquired magnetic recording medium 10 is directly wound around a large-diameter core, and a curing process is performed. Finally, after calendar processing is performed for the magnetic recording medium 10, the magnetic recording medium 10 is cut into a predetermined width (for example, a width of ½ inches). In this way described above, the magnetic recording medium 10 having a thin and long shape that is a target can be acquired.

(5) Recording and Reproducing Device (Configuration of Recording and Reproducing Device)

Next, an example of the configuration of a recording and reproducing device 30 performing recording and reproducing for the magnetic recording medium 10 having the configuration described above will be described with reference to FIG. 5.

The recording and reproducing device 30 has a configuration capable of adjusting tension applied to the longitudinal direction of the magnetic recording medium 10. In addition, the recording and reproducing device 30 has a configuration being able to load a magnetic recording cartridge 10A. Here, for the convenience of description, although a case in which the recording and reproducing device 30 has a configuration in which one magnetic recording cartridge 10A can be loaded will be described, the recording and reproducing device 30 may have a configuration in which a plurality of magnetic recording cartridges 10A can be loaded.

Preferably, the recording and reproducing device 30 is a magnetic recording and reproducing device of a timing servo type. The magnetic recording medium according to the present technology is appropriate for the use in a magnetic recording and reproducing device of the timing servo type.

The recording and reproducing device 30 is connected to information processing devices such as a server 41, a personal computer (hereinafter, referred to as a "PC") 42, and the like through a network 43 and is configured to be able to record data supplied from such information processing devices in the magnetic recording cartridge 10A. A shortest recording wavelength of the recording and reproducing device 30 is preferably 100 nm or less, more preferably 75 nm or less, furthermore preferably 60 nm or less, and particularly preferably 50 nm or less.

Figure 5:
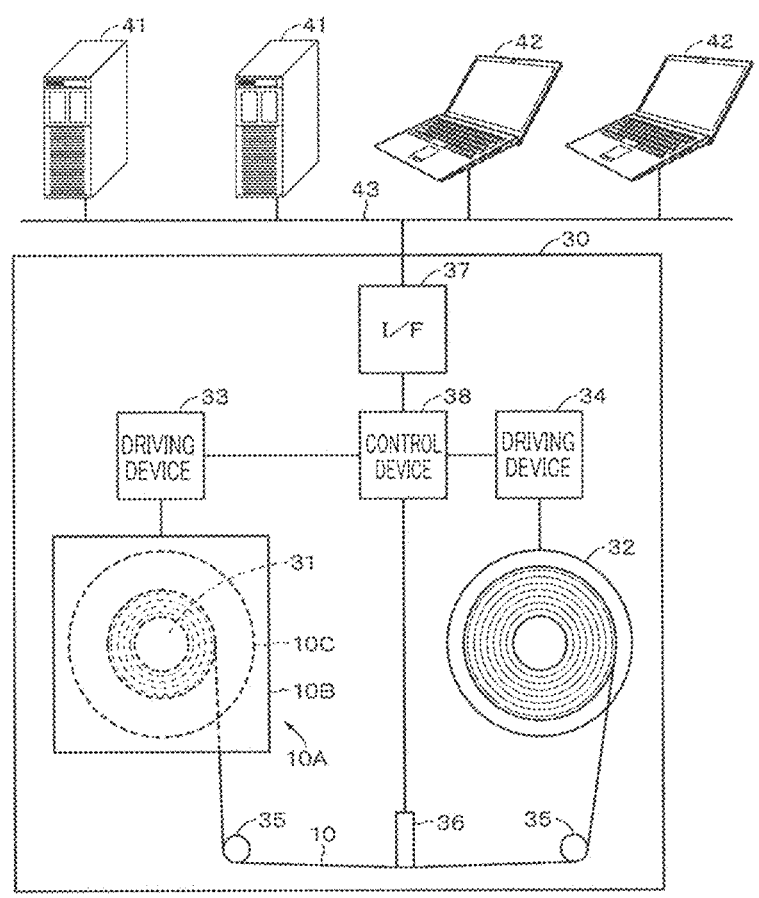
FIG. 5 is a schematic view illustrating a configuration of a recording and reproducing device.

As illustrated in FIG. 5, the recording and reproducing device includes a spindle 31, a recording and reproducing device-side reel 32, a spindle driving device 33, a reel driving device 34, a plurality of guide rollers 35, a head unit 36, a communication interface (hereinafter, referred to as I/F) 37, and a control device 38.

The spindle 31 is configured to be able to load a magnetic recording cartridge 10A. The magnetic recording cartridge 10A is in compliance with Linear Tape Open (LTO) standards and houses a single reel 10C around which a magnetic recording medium 10 is wound to be rotatable in a cartridge casing 10B. In the magnetic recording medium 10, as a servo signal, a servo pattern having an inverted "v" shape is recorded in advance. The reel 32 is configured to be able to fix a tip end of the magnetic recording medium 10 drawn out from the magnetic recording cartridge 10A.

The present technology also provides a magnetic recording cartridge including the magnetic recording medium according to the present technology. Inside this magnetic recording cartridge, the magnetic recording medium described above, for example, may be wound around a reel.

The spindle driving device 33 is a device that drives the spindle 31 to rotate. The reel driving device 34 is a device that drives the reel 32 to rotate. In recording or reproducing data for the magnetic recording medium 10, the spindle driving device 33 and the reel driving device 34 drives the spindle 31 and the reel 32 to rotate, thereby running the magnetic recording medium 10. The guide roller 35 is a roller used for guiding running of the magnetic recording medium 10.

The head unit 36 includes a plurality of recording heads used for recording data signals in the magnetic recording medium 10, a plurality of reproduction heads used for reproducing data signals recorded in the magnetic recording medium 10, and a plurality of servo heads used for reproducing servo signals recorded in the magnetic recording medium 10. As the recording head, for example, although a ring-type head can be used, the type of the recording head is not limited thereto.

The communication I/F 37 is used for communicating with information processing devices such as the server 41, the PC 42, and the like and is connected to the network 43.

The control device 38 controls the entire recording and reproducing device 30. For example, in response to a request from an information processing device such as the server 41, the PC 42, or the like, the control device 38 records a data signal supplied from the information processing device in the magnetic recording medium 10 using the head unit 36. In addition, in response to a request from an information processing device such as the server 41, the PC 42, or the like, the control device 38 reproduces a data signal recorded in the magnetic recording medium 10 using the head unit 36 and supplies the data signal to the information processing device.

In addition, the control device 38 detects a change of the width of the magnetic recording medium 10 on the basis of a servo signal supplied from the head unit 36. More specifically, a plurality of servo patterns having an inverted "v" shape are recorded in the magnetic recording medium 10 as servo signals, and the head unit 36 simultaneously reproduce two different servo patterns using two servo heads on the head unit 36 and can acquire individual servo signals. By using relative position information between the servo pattern acquired from this servo signal and the head unit, the position of the head unit 36 is controlled to follow the servo pattern. At the same time, by comparing two servo signal waveforms with each other, distance information between the servo patterns can be also acquired. By comparing distance information between these servo patterns acquired at the time of respective measurements, a change of the distance between servo patterns at the time of respective measurements can be acquired. By adding the distance information between servo patterns at the time of recording servo patterns thereto, a change of the width of the magnetic recording medium 10 can be calculated as well. On the basis of the change of the distance between servo patterns acquired as described above or the change of the width of the magnetic recording medium 10 that has been calculated, the control device 38 controls rotation driving of the spindle driving device 33 and the reel driving device 34 and adjusts the tension of the longitudinal direction of the magnetic recording medium 10 such that the width of the magnetic recording medium 10 is a regulated width or almost the regulated width. In accordance with this, the change of the width of the magnetic recording medium 10 can be inhibited.

[Operation of Recording and Reproducing Device]

Next, an operation of the recording and reproducing device 30 having the configuration described above will be described.

First, the magnetic recording cartridge 10A is mounted in the recording and reproducing device 30, a tip end of the magnetic recording medium 10 is extracted and is transferred to the reel 32 through a plurality of guide rollers 35 and the head unit 36, and the tip end of the magnetic recording medium 10 is mounted in the reel 32.

Next, when an operation unit not illustrated in the drawing is operated, the spindle driving device 33 and the reel driving device 34 are driven in accordance with control of the control device 38, and the spindle 31 and the reel 32 is rotated in the same direction such that the magnetic recording medium 10 runs from the reel 10C to the reel 32. In accordance with this, while the magnetic recording medium 10 is wound around the reel 32, recording of information in the magnetic recording medium 10 or reproduction of information recorded in the magnetic recording medium 10 is performed using the head unit 36.

In addition, in a case in which the magnetic recording medium 10 is wound around the reel 10C, the spindle 31 and the reel 32 are driven to rotate in a direction opposite to that described above, whereby the magnetic recording medium 10 runs from the reel 32 to the reel 10C. Also at the time of this winding, recording of information in the magnetic recording medium 10 or reproduction of information recorded in the magnetic recording medium 10 is performed using the head unit 36.

(6) Modified Examples

Modified Example 1

Figure 6:
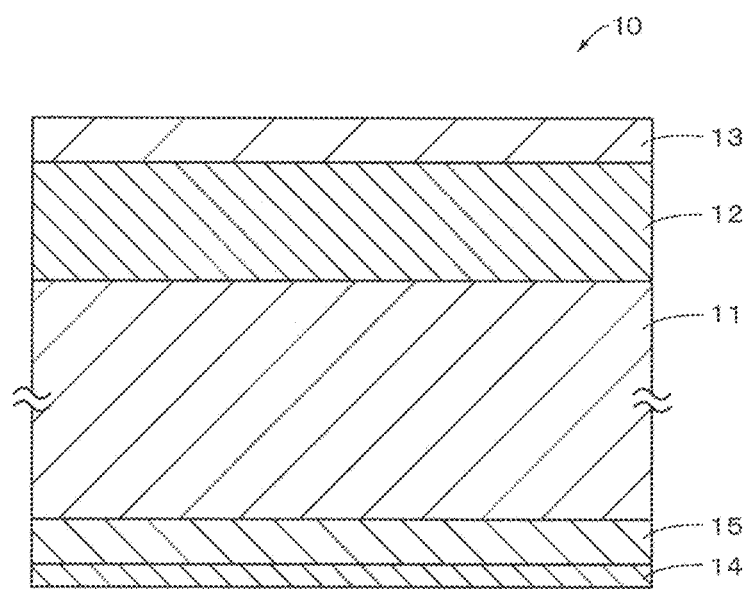
FIG. 6 is a cross-sectional view illustrating a configuration of a magnetic recording medium according to a modified example.

As illustrated in FIG. 6, the magnetic recording medium 10 may be configured to further include a barrier layer 15 disposed on at least one surface of the base layer 11. The barrier layer 15 is a layer that is used for inhibiting a dimensional change of the base layer 11 according to environments. For example, as an example of a cause affecting the dimensional change, there is hygroscopicity of the base layer 11, and, by disposing the barrier layer 15, a penetration speed of moisture into the base layer 11 can decrease. The barrier layer 15, for example, includes metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, and Ta can be used. As the metal oxide, for example, at least one of $Al_2O_3$, CuO, CoO, $SiO_2$, $Cr_2O_3$, $TiO_2$, $Ta_2O_5$, and $ZrO_2$ can be used, and any one of oxides of the metals described above may be also used. In addition, diamond-like carbon (DLC), diamond, or the like can be used.

An average thickness of the barrier layer 15 is preferably 20 nm or more and 1000 nm or less and more preferably 50 nm or more and 1000 nm or less. The average thickness of the barrier layer 15 can be acquired in a manner similar to that for the average thickness $t_m$ of the magnetic layer 13. Here, the magnification of the TEM image is appropriate adjusted in accordance with the thickness of the barrier layer 15.

Modified Example 2

The magnetic recording medium 10 may be embedded in a library device. In other words, the present technology also provides a library device including at least one magnetic recording medium 10. This library device has a configuration to be able to adjust tension applied to the longitudinal direction of the magnetic recording medium 10 and may include a plurality of recording and reproducing devices 30 described above.

Modified Example 3

The magnetic recording medium 10 may be added in a servo signal writing process using a servo writer. This servo writer adjusts the tension of the longitudinal direction of the magnetic recording medium 10 at the time of recording a servo signal or the like, whereby the width of the magnetic recording medium 10 can be maintained to be constant or almost constant. In this case, this servo writer may include a detection device that detects a width of the magnetic recording medium 10. On the basis of a detection result acquired by the detection device, the servo writer can adjust the tension of the longitudinal direction of the magnetic recording medium 10.

3. Second Embodiment (1) Magnetic Recording Cartridge According to One Embodiment

[Configuration of Cartridge]

The present technology also provides a magnetic recording cartridge including the magnetic recording medium of the present technology (also referred to as a tape cartridge). Inside this magnetic recording cartridge, for example, the magnetic recording medium described above may be wound around a reel. This magnetic recording cartridge, for example, may include a communication unit that communicates with a recording and reproducing device, a storage unit, and a control unit that stores information received from the recording and reproducing device described above through the communication unit in the storage unit, reads information from the storage unit described above in response to a request from the recording and reproducing device described above, and transmits the read information to the recording and reproducing device through the communication unit. The information described above may include adjustment information used for adjusting tension applied to the longitudinal direction of the magnetic recording medium.

An example of the configuration of the magnetic recording cartridge 10A including the magnetic recording medium T having the configuration described above will be described with reference to FIG. 7.

Figure 7:
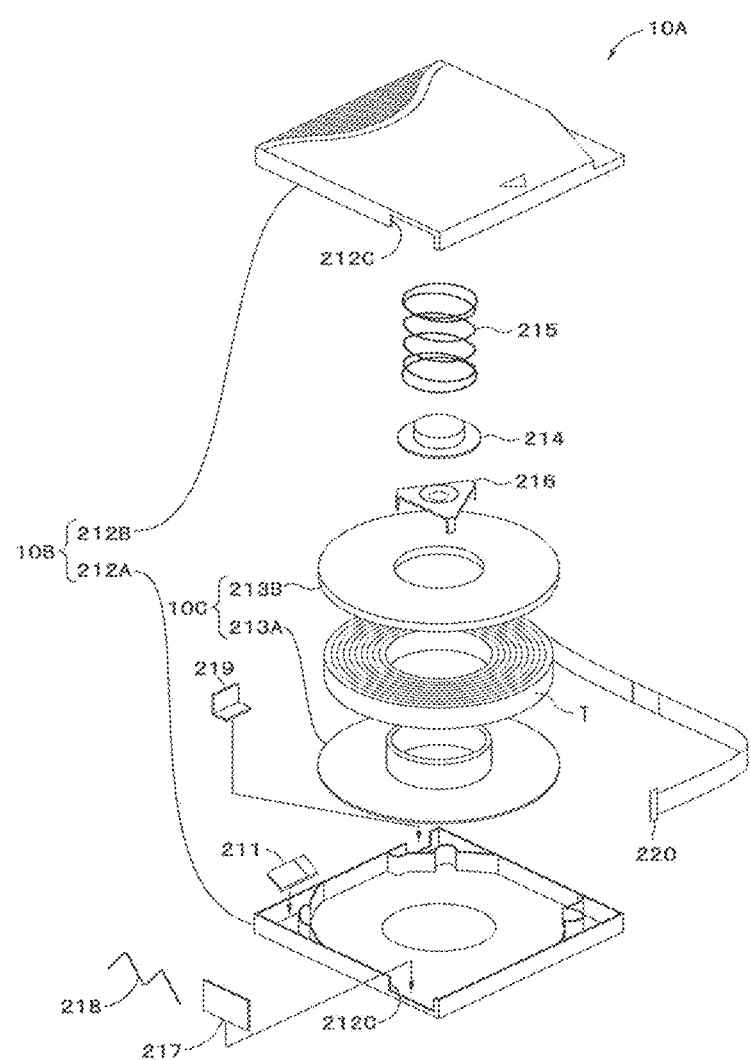
FIG. 7 is an exploded perspective view illustrating an example of a configuration of a magnetic recording cartridge.

FIG. 7 is an exploded perspective view illustrating an example of the configuration of the cartridge 10A. The magnetic recording cartridge 10A is a magnetic recording cartridge compliant with Linear Tape-Open (LTO) standards and, inside the cartridge casing 10B composed of a lower shell 212A and an upper shell 212B, includes a reel 10C around which a magnetic tape (a magnetic recording medium of a tape form) T is wound, a reel lock 214 and a reel spring 215 used for locking rotation of the reel 10C, a spider 216 used for releasing a locked state of the reel 10C, a slide door 217 opening/closing a tape drawing-out port 212C disposed in the cartridge casing 10B over the lower shell 212A and the upper shell 212B, a door spring 218 that biases the slide door 217 to a closing position of the tape drawing-out port 212C, a write protection 219 used for preventing erroneous deletion, and a cartridge memory 211. The reel 10C has an approximate disc shape having an opening at its center and is composed of a reel hub 213A formed from a hard material such as plastic and a flange 213B. A leader tape LT is connected to one end part of the magnetic tape T. A leader pin 220 is disposed at a tip end of the leader tape LT.

The cartridge memory 211 is disposed near one corner of the magnetic recording cartridge 10A. In a state in which the magnetic recording cartridge 10A is loaded in the recording and reproducing device 80, the cartridge memory 211 is configured to face a reader/writer (not illustrated in the drawing) of the recording and reproducing device 80. The cartridge memory 211 communicates with the recording and reproducing device 30, more specifically a reader/writer (not illustrated in the drawing) using radio communication standards compliant with the LTO standards.

[Configuration of Cartridge Memory]

An example of the configuration of the cartridge memory 211 will be described with reference to FIG. 8.

Figure 8:
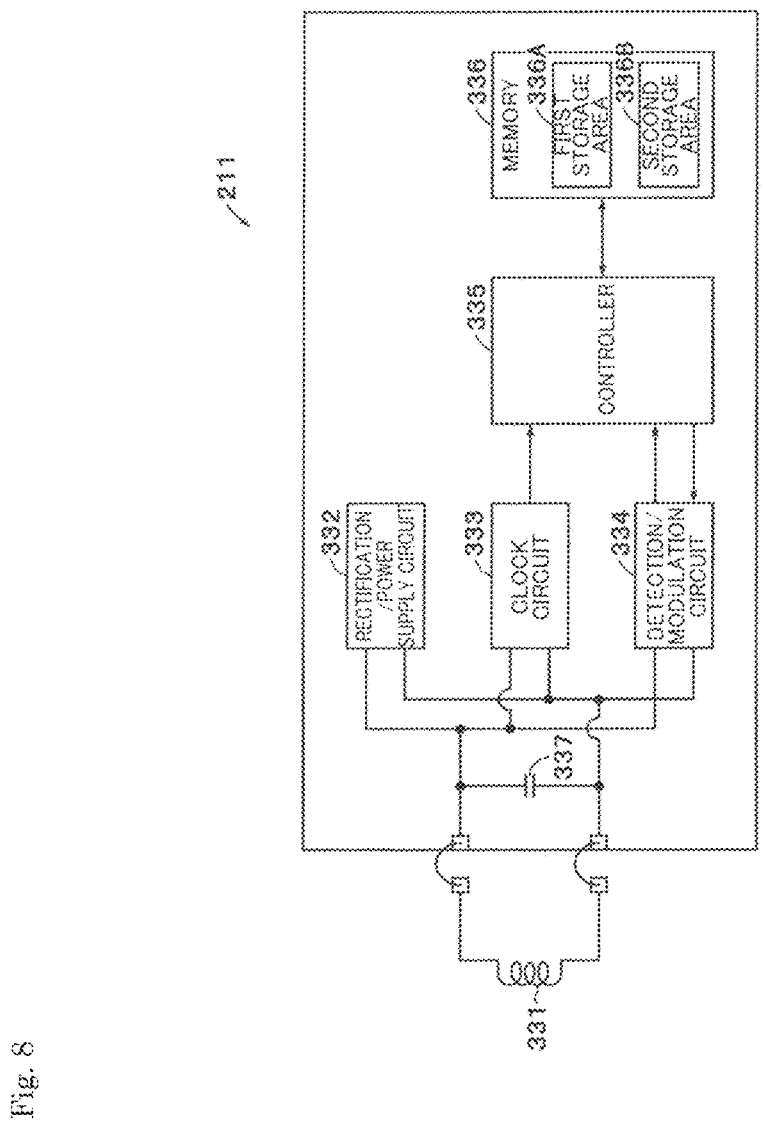
FIG. 8 is a block diagram illustrating an example of a configuration a cartridge memory.

FIG. 8 is a block diagram illustrating an example of the configuration of the cartridge memory 211. The cartridge memory 211 includes an antenna coil (communication unit) 331 that communicates with a reader/writer (not illustrated in the drawing) using prescribed communication standards, a rectification/power supply circuit 332 that generates a power source by generating and rectifying electric power using an induced electromotive force from electric waves received using the antenna coil 331, a clock circuit 333 that generates a clock using the same induced electromotive force from electric waves received using the antenna coil 331, a detection/modulation circuit 334 that performs detection of electric waves received using the antenna coil 331 and modulation of a signal transmitted using the antenna coil 331, a controller (control unit) 335 composed of a logic circuit used for determining a command and data from a digital signal extracted by the detection/modulation circuit 334 and processing them and the like, and a memory (storage unit) 336 that stores information. In addition, the cartridge memory 211 includes a capacitor 337 which is connected to the antenna coil 331 in parallel, and a resonance circuit is constituted by the antenna coil 331 and the capacitor 337.

The memory 336 stores information relating to the magnetic recording cartridge 10A and the like. The memory 336 is a non-volatile memory (NVM). A storage capacity of the memory 336 is preferably approximately 32 KB or more. For example, in a case in which the magnetic recording cartridge 10A is in compliance with LTO format standards of the next generation and subsequent generations, the memory 336 has a storage capacity of about 32 KB.

The memory 336 has a first storage area 336A and a second storage area 336B. The first storage area 336A corresponds to a storage area of a cartridge memory of LTO standards before LTO8 (hereinafter, referred to as a "conventional cartridge memory") and is an area for storing information compliant with LTO standards before LTO8. For example, the information compliant with the LTO standards before LTO8 is manufacturing information (for example, a serial number of the magnetic recording cartridge 10A and the like), a use history (for example, tape thread count, and the like), and the like.

The second storage area 336B corresponds to an extended storage area for the storage area of a conventional cartridge memory. The second storage area 336B is an area for storing additional information. Here, the additional information represents information relating to the magnetic recording cartridge 10A not defined in the LTO standards before LTO8. Examples of the additional information include tension adjustment information, management ledger data, index information, or thumbnail information of a moving image stored in the magnetic tape T, and the like and are not limited to such data. The tension adjustment information includes a distance between servo bands adjacent to each other (a distance between servo patterns recorded in servo bands adjacent to each other) at the time of data recording for the magnetic tape T. The distance between servo bands adjacent to each other is an example of width-related information relating to the width of the magnetic tape T. Details of the distance between servo bands will be described below. In the following description, information stored in the first storage area 336A may be referred to as "first information", and information stored in the second storage area 336B may be referred to as "second information".

The memory 336 may include a plurality of banks. In such a case, the first storage area 336A is configured using some banks among a plurality of banks, and the second storage area 336B may be configured using the remaining banks. More specifically, for example, in a case in which the magnetic recording cartridge 10A is compliant with LTO format standards of the next generation and subsequent generations, the memory 336 has two banks having a storage capacity of about 16 KB, the first storage area 336A may be configured using one out of the two banks, and the second storage area 336B may be configured using the other bank.

The antenna coil 331 induces an induced voltage by electromagnetic induction. The controller 335 communicates with the recording and reproducing device 80 using a prescribed communication standard through the antenna coil 331. More specifically, for example, mutual authentication, transmission/reception of a command, exchange of data, and the like are performed.

The controller 335 stores information received from the recording and reproducing device 80 through the antenna coil 331 in the memory 336. In response to a request from the recording and reproducing device 80, the controller 335 reads information from the memory 336 and transmits the read information to the recording and reproducing device 80 through the antenna coil 331.

(2) Modified Example of Magnetic Recording Cartridge

[Configuration of Cartridge]

In the above-described magnetic recording cartridge according to one embodiment, although a case in which the magnetic tape cartridge is a 1-reel type cartridge has been described, the magnetic recording cartridge according to the present technology may be a 2-reel type cartridge. In other words, the magnetic recording cartridge according to the present technology may include one or a plurality of (for example, two) reels around which the magnetic tape is wound. Hereinafter, an example of the magnetic recording cartridge according to the present technology having two reels will be described with reference to FIG. 9.

Figure 9:
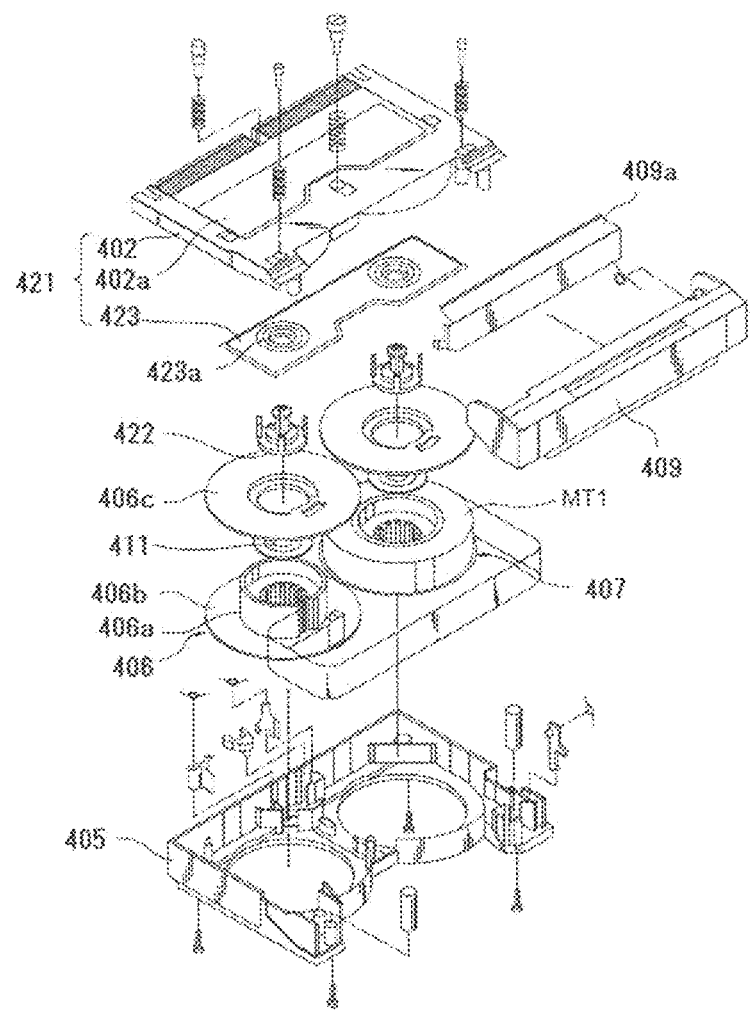
FIG. 9 is an exploded perspective view illustrating an example of a configuration of a modified example of a magnetic recording cartridge.

FIG. 9 is an exploded perspective view illustrating an example of a configuration of a 2-reel type cartridge 421. The cartridge 421 includes an upper half 402 made of a synthetic resin, a transparent window member 423 fitted and fixed to a window portion 402a opened on the upper surface of the upper half 402, a reel holder 422 that is fixed to the inside of the upper half 402 to prevent reels 406 and 407 from floating, a lower half 405 that corresponds to the upper half 402, the reels 406 and 407 that are accommodated in a space formed by combining the upper half 402 and the lower half 405, a magnetic tape MT1 that is wound around the reels 406 and 407, a front lid 409 that closes a front opening formed by combining the upper half 402 and the lower half 405, and a back lid 409A that protects the magnetic tape MT1 exposed on the front opening.

The reel 406 includes a lower flange 406*b* having a cylindrical hub portion 406*a* around which the magnetic tape MT1 is wound in the center thereof, an upper flange 406*c* having substantially the same size as the lower flange 406*b*, and a reel plate 411 sandwiched between the hub portion 406*a* and the upper flange 406*c*. The reel 407 has the same configuration as the reel 406.

The window member 423 is provided with attachment holes 423*a* for assembling the reel holder 422, which is a reel holding means for preventing the reels from floating, at positions corresponding to the reels 406 and 407. The magnetic tape MT1 is the same as the magnetic tape T according to the first embodiment.

The present technology can employ the following configurations.

[1]

A magnetic recording medium including a magnetic layer containing magnetic powders, in which the magnetic layer contains first particles having conductivity and second particles of which Mohs hardness is 7 or more, protrusions are formed on a surface of the magnetic layer side in accordance with the first particles and the second particles, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of the protrusions formed in accordance with the second particles is 7 nm or less.

[2]

The magnetic recording medium described in [1], wherein the first particles are carbon particles.

[3]

The magnetic recording medium described in [1] or [2], wherein the second particles are inorganic particles.

[4]

The magnetic recording medium described in any one of [1] to [3], wherein the second particles are alumina particles.

[5]

The magnetic recording medium described in any one of [1] to [4], wherein the shape of the magnetic powders is one of a plate shape, a sphere shape, and a square shape.

[6]

The magnetic recording medium described in any one of [1] to [5], wherein the number of the protrusions formed in accordance with the second particles on the surface of the magnetic layer side is two or more per unit area ($\mu m^2$).

[7]

The magnetic recording medium described in any one of [1] to [6], wherein a ratio of the second particles forming protrusions having protrusion heights of 10 nm or more to the second particles forming protrusions having protrusion heights of 4 nm or more on the surface of the magnetic layer side is 20% or less.

[8]

The magnetic recording medium described in any one of [1] to [7], wherein the number of the protrusions formed in accordance with the first particles on the surface of the magnetic layer side is 0.2 or more and 1.5 or less per unit area ($\mu m^2$).

[9]

The magnetic recording medium described in any one of [1] to [8], wherein a ratio of the first particles forming protrusions having protrusion heights of 10 nm or more to the first particles forming protrusions having protrusion heights of 4 nm or more on the surface of the magnetic layer side is 60% or less.

[10]

The magnetic recording medium described in any one of [1] to [9], wherein an average thickness (an average total thickness) is 5.7 µm or less.

[11]

The magnetic recording medium described in any one of [1] to [10], wherein an average thickness of the magnetic layer is 0.08 µm or less.

[12]

The magnetic recording medium described in any one of [1] to [11], wherein abrasivity of an AlTiC rectangular prism satisfies the following relational expression.

$$12.5 \leq \text{Abrasivity} \leq 20$$

[13]

A magnetic recording medium including a magnetic layer containing magnetic powders, in which the magnetic layer contains first particles having conductivity and second particles of which Mohs hardness is 7 or more, protrusions are formed on a surface of the magnetic layer side in accordance with the first particles and the second particles, a ratio ($H_1/H_2$) of an average height ($H_1$) of protrusions formed in accordance with the first particles to an average height ($H_2$) of protrusions formed in accordance with the second particles is 2.3 or less, and the average height ($H_1$) of the protrusions formed in accordance with the first particles is 12 nm or less.

[14]

A magnetic recording cartridge in which the magnetic recording medium described in any one of [1] to [13] is wound around a reel.

4. Working Example

Hereinafter, the present technology will be described below in detail with reference to examples, but the present technology is not limited to these examples.

In this working example, an average area per protrusion formed in accordance with each of the first particle and the second particle (referred to as an SEM_average area in Table 1), the total area of the protrusion (referred to as an SEM_total area in Table 1), the number of protrusions per unit area (protrusion density), an average height of protrusions (referred to as an AFM_protrusion average height in Table 1), an average diameter (Feret diameter) of protrusions, a ratio of the first particles forming protrusions having protrusion heights of 10 nm or more, a ratio of the second particles forming protrusions having protrusion heights of 10 nm or more, abrasivity of the AlTic rectangular prism, an average thickness (average total thickness) $t_T$ of the magnetic tape, an average thickness $t_m$ of the magnetic layer, an average thickness of the non-magnetic layer (underlayer), an average thickness of the base layer, an average thickness of the back layer, and a standard deviation σPES of the PES value are acquired using the measurement method described in the embodiment described above.

Example 1

(Preparation Process of Magnetic Layer Forming Coating Material)

A magnetic layer forming coating material is prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.
(First Composition)
  Magnetic powder (hexagonal ferrite having an M-type structure; composition: Ba-Ferrite, Shape: plate-type hexagonal particle; average particle volume: 2500 nm$^3$): 100 parts by mass
  Vinyl chloride resin (cyclohexanone solution of 30% by mass): 46 parts by mass (Polymerization degree 300, Mn=10000, containing OSO$_3$K=0.07 mmol/g, secondary OH=0.3 mmol/g as a polar group)
  Aluminum oxide powder: 7.5 parts by mass
  ($\alpha$-Al$_2$O$_3$, average particle diameter 80 nm, manufactured by Sumitomo Chemical Co., Ltd., Trade name: HIT82, Mohs hardness: 9)
  Carbon black: 2.0 parts by mass (average particle diameter 70 nm, manufactured by Tokai Carbon Corp., Trade name: Seast TA)
(Second Composition)
  Vinyl chloride resin: 1.6 parts by mass
  (cyclohexanone solution 30% by mass as resin)
  n-butyl stearate: 2 parts by mass
  Methyl ethyl ketone: 121.3 parts by mass
  Toluene: 121.3 parts by mass
  Cyclohexanone: 60.7 parts by mass
  Finally, polyisocyanate (Trade name: Coronate L manufactured by Japan Polyurethan Corporation) of 2 parts by mass as a curing agent and myristic acid of 2 parts by mass were added to the magnetic layer forming coating material prepared as described above. In addition, the magnetic layer P/B ratio represents a ratio of magnetic powder/bonding agent (binder) and was 7.0. Hereinafter, a P/B ratio in each example is represented in Table 1.
(Preparation Process of Underlayer Forming Coating Material)
  An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.
(Third Composition)
  Needlelike iron oxide powder: 100 parts by mass
  ($\alpha$-Fe$_2$O$_3$, average major axis length of 0.15 μm)
  Vinyl chloride resin: 55.6 parts by mass
  (Resin solution: resin content 30% by mass, cyclohexanone 70% by mass)
  Carbon black: 10 parts by mass
  (average particle size of 20 nm)
(Fourth Composition)
  Polyurethane resin UR8200 (manufactured by Toyo Boseki Kabushiki Kaisha): 18.5 parts by mass
  n-butyl stearate: 2 parts by mass
  Methyl ethyl ketone: 108.2 parts by mass
  Toluene: 108.2 parts by mass
  Cyclohexanone:18.5 parts by mass
  Finally, polyisocyanate (trade name: Coronate L, manufactured by TOSOH Corp.): 2 parts by mass and myristic acid: 2 parts by mass were added as curing agents to the underlayer forming coating material prepared as described above.

(Preparation Process of Back Layer Forming Coating Material)
  A back layer forming coating material was prepared as follows. The following raw materials were mixed in a stirring tank equipped with a disperser and filtered to prepare a back layer forming coating material.
  Carbon black (manufactured by Asahi Co, Trade name: #80): 100 parts by mass Polyester polyurethane: 100 parts by mass
  (Made by Nippon Polyurethane Industry Co., Ltd., trade name: N-2304)
  Methyl ethyl ketone: 500 parts by mass
  Toluene: 400 parts by mass
  Cyclohexanone: 100 parts by mass
  Polyisocyanate (Trade name: Coronate L manufactured by Tosoh Corp.): 10 parts by mass
(Film Forming Process)
  By using the coating material manufactured as described above, a magnetic tape was manufactured as described below.
  First, as a support body that becomes a base layer of the magnetic tape, a PEN film (a base film) of an average thickness of 4.0 μm having a long form was prepared. Next, by coating one principal face of the PEN film with an underlayer forming coating material and drying the underlayer forming coating material, an underlayer of an average thickness of 1.05 μm at the time of being formed as a final product was formed on the one principal face of the PEN film. Next, by coating the underlayer with a magnetic layer forming coating material and drying the magnetic layer forming coating material, a magnetic layer of an average thickness of 0.08 μm at the time of being formed as a final product was formed on the underlayer.
  Subsequently, by coating the other principal face of the PEN film on which the underlayer and the magnetic layer were formed with a back layer forming coating material and drying the back layer forming coating material, a back layer having an average thickness of 0.50 μm at the time of being formed as a final product was formed. Then, a curing process was performed for the PEN film on which the underlayer, the magnetic layer, and the back layer were formed. Thereafter, a calendaring process was performed, and the magnetic layer surface was smoothed.
(Cutting Process)
  The magnetic tape obtained as described above was cut to a width of ½ inches (12.65 mm). In accordance therewith, the magnetic tape having a long form was obtained.
  By winding this magnetic tape having a width of ½ inch around a reel disposed inside the cartridge casing, a magnetic recording cartridge was obtained. A servo signal was recorded on this magnetic tape using a servo track writer. This servo signal is formed from a column of magnetic patterns having an inverted "v" shape, and these magnetic patterns were recorded in two or more columns in advance in parallel with the longitudinal direction with a known internal therebetween (hereinafter, referred to as a known interval of magnetic pattern columns at the time of being recorded in advance").
  In the obtained magnetic tape, a ratio ($H_1/H_2$) of an average height ($H_1$) of protrusions formed in accordance with carbon black particles corresponding to first particles to an average height ($H_2$) of protrusions formed in accordance with aluminum oxide ($\alpha$-Al$_2$O$_3$; hereinafter referred to as alumina) corresponding to second particles was 2.21, an average height ($H_1$) of protrusions formed in accordance with first particles was 11.3 nm, an average height ($H_2$) of protrusions formed in accordance with second particles was 5.1 nm or less, a ratio of the first particles described above forming protrusions having protrusion heights of 10 nm or more was 58%, a ratio of the second particles described above forming protrusions having protrusion heights of 10 nm or more was 5.9%, an average thickness (an average total thickness) $t_T$ of the magnetic tape was 5.63 μm, an average thickness $t_m$ of the magnetic layer was 0.08 μm, an average thickness of the non-magnetic layer (the underlayer) was 1.05 μm, an average thickness of the base layer was 4.00 μm, and an average thickness of the back layer was 0.50 μm. The standard deviation σPES of the PES value was less than 50 nm within 40 FV number, and an excellent friction rise inhibiting effect could be acquired. The abrasivity of the AlTiC rectangular prism was 16.0 in 100 passes and was 16.6 in 200 passes, and both had excellent polishing forces.

Example 2

In Example 1, by using magnetic powders (hexagonal ferrite having an M-type structure, composition: Ba-Ferrite, and an average particle volume: 1600 nm³), a vinyl chloride resin (cyclohexanone solution of 30% by mass) that is a first composition was 65 parts by mass, and aluminum oxide powder (α-Al₂O₃, average particle diameter 80 nm, manufactured by Sumitomo Chemical Co., Ltd., Trade name: HIT82, Mohs hardness: 9): 5.0 parts by mass and carbon black (average particle diameter 70 nm, manufactured by Tokai Carbon Corp., Trade name: Seast TA): 2.0 parts by mass were added, a ratio ($H_1/H_2$) of an average height ($H_1$) of protrusions formed in accordance with first particles to an average height ($H_2$) of protrusions formed in accordance with second particles was 2.04, and the average height ($H_1$) of protrusions formed in accordance with the first particles was 10.4 nm, and the others were the same as those of Example 1 to obtain a magnetic tape. A ratio of the first particles described above forming protrusions having protrusion heights of 10 nm or more was 35%, a ratio of the second particles described above forming protrusions having protrusion heights of 10 nm or more was 0%, an average thickness (an average total thickness) $t_T$ of the magnetic tape was 5.68 μm, an average thickness $t_m$ of the magnetic layer was 0.08 μm, an average thickness of the non-magnetic layer (the underlayer) was 1.10 μm, an average thickness of the base layer was 4.02 μm, an average thickness of the back layer was 0.48 μm, and the standard deviation σPES of the PES value was less than 50 nm within 40 FV number, and an excellent friction rise inhibiting effect could be acquired. The abrasivity of the AlTiC rectangular prism was 17.0 in 100 passes and was 16.0 in 200 passes, and both had excellent polishing forces.

Example 3

In Example 1, by using magnetic powders (hexagonal ferrite having an M-type structure, composition: Ba-Ferrite, and an average particle volume: 1600 nm³), a bar of a rectangular prism produced using the ceramic material (AlTiC) illustrated in FIG. 3 is mounted in the dedicated jig illustrated in FIG. 2, and a magnetic tape is caused to run in a reciprocating manner on the bar of the rectangular prism (the abrasivity bar), and a process of cutting out protrusions formed in accordance with carbon black particles protruding to the surface of the magnetic tape was performed. In the obtained magnetic tape, a ratio ($H_1/H_2$) of an average height ($H_1$) of protrusions formed in accordance with first particles to an average height ($H_2$) of protrusions formed in accordance with second particles was 1.52, an average height ($H_1$) of protrusions formed in accordance with first particles was 7.6 nm, an average height ($H_2$) of protrusions formed in accordance with second particles was 5.0 nm, and the others were the same as those of Example 1 to obtain a magnetic tape. A ratio of the first particles described above forming protrusions having protrusion heights of 10 nm or more was 80%, a ratio of the second particles described above forming protrusions having protrusion heights of 10 nm or more was 0%, an average thickness (an average total thickness) $t_T$ of the magnetic tape was 5.58 μm, an average thickness $t_m$ of the magnetic layer was 0.08 μm, an average thickness of the non-magnetic layer (the underlayer) was 1.02 μm, an average thickness of the base layer was 4.00 μm, an average thickness of the back layer was 0.48 μm, and the standard deviation σPES of the PES value was 50 nm or less within 40 FV number, and an excellent friction rise inhibiting effect could be acquired. The abrasivity of the AlTiC rectangular prism was 16.6 in 100 passes and was 16.0 in 200 passes, and both had excellent polishing forces.

Example 4

In Example 1, by using magnetic powders (hexagonal ferrite having an M-type structure, composition: Ba-Ferrite, and an average particle volume: 1600 nm³), in the magnetic layer forming coating material, a vinyl chloride resin (cyclohexanone solution of 30% by mass) that is a first composition was 65 parts by mass, a ratio ($H_1/H_2$) of an average height ($H_1$) of protrusions formed in accordance with first particles to an average height ($H_2$) of protrusions formed in accordance with second particles was 1.73, and the average height ($H_1$) of protrusions formed in accordance with first particles was 11.4 nm, the average height ($H_2$) of protrusions formed in accordance with second particles was 6.6 nm, and the others were the same as those of Example 1 to obtain a magnetic tape. A ratio of the first particles described above forming protrusions having protrusion heights of 10 nm or more was 93%, a ratio of the second particles described above forming protrusions having protrusion heights of 10 nm or more was 13%, an average thickness (an average total thickness) $t_T$ of the magnetic tape was 5.52 μm, an average thickness $t_m$ of the magnetic layer was 0.07 μm, an average thickness of the non-magnetic layer (the underlayer) was 1.00 μm, an average thickness of the base layer was 4.00 μm, an average thickness of the back layer was 0.45 μm, and the standard deviation σPES of the PES value was 50 nm or less within 40 FV number, and an excellent friction rise inhibiting effect could be acquired. The abrasivity of the AlTiC rectangular prism was 18.5 in 100 passes and was 18.0 in 200 passes, and both had excellent polishing forces.

Example 5

In Example 1, by using magnetic powders (hexagonal ferrite having an M-type structure, composition: Ba-Ferrite, and an average particle volume: 1600 nm³), in a magnetic layer forming coating material, aluminum oxide powder: 5.0 parts by mass (α-Al₂O₃, average particle diameter 80 nm, manufactured by Sumitomo Chemical Co., Ltd., Trade name: HIT82, Mohs hardness: 9) is added to not the first composition but the second composition (vinyl chloride resin: 1.1 parts by mass (resin solution: resin part 30 mass %, cyclohexanone 70 mass %), n-butyl stearate: 2 parts by mass, methyl ethyl ketone: 121.3 parts by mass, toluene: 121.3 parts by mass, cyclohexanone: 60.7 parts by mass)) and was dispersed, a ratio ($H_1/H_2$) of an average height ($H_1$) of protrusions formed in accordance with first particles to an average height ($H_2$) of protrusions formed in accordance with second particles was 1.93, and the average height ($H_1$) of protrusions formed in accordance with first particles was 11.8 nm, the average height ($H_2$) of protrusions formed in accordance with second particles was 6.1 nm, and the others were the same as those of Example 1 to obtain a magnetic tape. A ratio of the first particles described above forming protrusions having protrusion heights of 10 nm or more was 69%, a ratio of the second particles described above forming protrusions having protrusion heights of 10 nm or more was 0%, an average thickness (an average total thickness) $t_T$ of the magnetic tape was 5.62 μm, an average thickness $t_m$ of the magnetic layer was 0.08 μm, an average thickness of the non-magnetic layer (the underlayer) was 1.07 μm, an average thickness of the base layer was 3.98 μm, an average thickness of the back layer was 0.49 μm, and the standard deviation σPES of the PES value was 50 nm or less within 40 FV number, and thus an excellent friction rise inhibiting effect could be acquired. The abrasivity of the AlTiC rectangular prism was 15.0 in 100 passes and was 10.0 in 200 passes.

Comparative Example 1

In Example 1, carbon black particles, of which a particle size is 100 nm, of 2.0 parts by mass and carbon black particles, of which a particle size is 70 nm, of 1.5 parts by mass are mixed, a ratio ($H_1/H_2$) of an average height ($H_1$) of protrusions formed in accordance with first particles to an average height ($H_2$) of protrusions formed in accordance with second particles was 2.35, and the average height ($H_1$) of protrusions formed in accordance with the first particles was 12.2 nm, the average height ($H_2$) of protrusions formed in accordance with the second particles was 5.2 nm, and the others were the same as those of Example 1 to obtain a magnetic tape. The standard deviation σPES of the PES value exceeded 50 nm within 40 FV number, and thus the friction rise inhibiting effect was defective. The reason for this is assumed that the ratio ($H_1/H_2$) of an average height ($H_1$) of protrusions formed in accordance with the first particles to an average height ($H_2$) of protrusions formed in accordance with the second particles exceeded 2.3, thus in accordance with carbon black particles corresponding to the first particles being cut in accordance with running of the magnetic tape, a contact area between the magnetic tape surface and the magnetic head was increased.

Comparative Example 2

In Example 1, by using magnetic powders (hexagonal ferrite having an M-type structure, composition: Ba-Ferrite, and an average particle volume: 1600 $nm^3$), aluminum oxide powder of a particle size of 100 nm ($\alpha$-$Al_2O_3$, average particle diameter 100 nm, manufactured by Sumitomo Chemical Co., Ltd., Trade name: HIT60A, Mohs hardness: 9) of 5 parts by mass is added, the thickness of the magnetic layer and the thickness of the back layer are formed to be thin, a ratio ($H_1/H_2$) of an average height ($H_1$) of protrusions formed in accordance with first particles to an average height ($H_2$) of protrusions formed in accordance with second particles was 1.57, and the average height ($H_1$) of protrusions formed in accordance with the first particles was 12.9 nm, the average height ($H_2$) of protrusions formed in accordance with the second particles was 8.2 nm, and the others were the same as those of Example 1 to obtain a magnetic tape. The abrasivity of the AlTiC rectangular prism was 21.0 in 100 passes, and the polishing force was too strong. The reason for this is that the average particle diameter of aluminum oxide powders corresponding to the second particles became too large, and the average height ($H_2$) of protrusions formed in accordance with the second particles exceeded 7 nm, and an initial polishing force (abrasivity 100 pass) became large.

Comparative Example 3

In Example 1, by using magnetic powders (needle-shape metal, composition: Co 23 atm %, Fe 77 atm %, average particle volume: 3000 $nm^3$), a vinyl chloride resin (cyclohexanone solution of 30% by mass) of the first composition is used as 65 parts by mass, aluminum oxide powders: 5.0 parts by mass ($\alpha$-$Al_2O_3$, average particle diameter 80 nm, manufactured by Sumitomo Chemical Co., Ltd., Trade name: HIT82, Mohs hardness: 9) are mixed, a ratio ($H_1/H_2$) of an average height ($H_1$) of protrusions formed in accordance with first particles to an average height ($H_2$) of protrusions formed in accordance with second particles was 2.05, the average height ($H_1$) of protrusions formed in accordance with the first particles was 12.7 nm, the average height ($H_2$) of protrusions formed in accordance with the second particles was 6.2 nm, and the others were the same as those of Example 1 to obtain a magnetic tape. The abrasivity of the AlTiC rectangular prism was 26.4 in 100 passes and was 24.1 in 200 passes. The reason for this is assumed that the magnetic powders are needle-shape metal magnetic powders and are oriented in the longitudinal direction, and thus the polishing force became too strong.

Comparative Example 4

In Example 1, by using magnetic powders (hexagonal ferrite having an M-type structure, composition: Ba-Ferrite, and an average particle volume: 1600 $nm^3$), in a magnetic layer forming coating material, aluminum oxide powder ($\alpha$-$Al_2O_3$, average particle diameter 80 nm, manufactured by Sumitomo Chemical Co., Ltd., Trade name: HIT82, Mohs hardness: 9) of 5.0 parts by mass was mixed, a ratio ($H_1/H_2$) of an average height ($H_1$) of protrusions formed in accordance with first particles to an average height ($H_2$) of protrusions formed in accordance with second particles was 3.00, the average height ($H_1$) of protrusions formed in accordance with first particles was 14.7 nm, the average height ($H_2$) of protrusions formed in accordance with second particles was 4.9 nm, and the others were the same as those of Example 1 to obtain a magnetic tape. The standard deviation σPES of the PES value exceeded 50 nm within 40 FV number, and the friction rise inhibiting effect was defective. The abrasivity of the AlTiC rectangular prism was 12.0 in 100 passes and was 12.0 in 200 passes, and thus the abrasivity was degraded. The reason for this is assumed that the average height ($H_1$) of protrusions formed in accordance with the first particles became much higher than the average height ($H_2$) of protrusions formed in accordance with the second particles, and the chance for the second particle to be brought into contact with the magnetic head decreased, and the polishing force decreased. Table 1 represents configurations of the magnetic tapes and evaluation results of Examples 1 to 5 and Comparative examples 1 to 4.

TABLE 1

| | | First particle | | | | | | Second particle | |
|---|---|---|---|---|---|---|---|---|---|
| | Magnetic component | First particle size (nm) | First particle amount | SEM_ average area (nm²) | SEM_ quantity (counts/μm²) | AFM_ protrusion average height (nm) | Number of heights of 10 nm or more/ number of heights of 4 nm or more | Second particle size (nm) | Second particle amount |
| Example 1 | Barium ferrite 2500 nm³ | 70 | 2.0 | 8400 | 1.4 | 11.3 | 58% | 80 | 7.5 |
| Example 2 | Barium ferrite 1600 nm³ | 70 | 2.0 | 8000 | 0.9 | 10.4 | 35% | 80 | 5.0 |
| Example 3 | Barium ferrite 1600 nm³ | 70 | 2.0 | 9300 | 1.7 | 7.6 | 80% | 80 | 7.5 |
| Example 4 | Barium ferrite 1600 nm³ | 70 | 2.0 | 7800 | 1.3 | 11.4 | 93% | 80 | 7.5 |
| Example 5 | Barium ferrite 1600 nm³ | 70 | 2.0 | 9400 | 1.2 | 11.8 | 69% | 80 | 5.0 |
| Comparative example 1 | Barium ferrite 2500 nm³ | 100 70 | 2.0 1.5 | 5200 | 2.8 | 12.2 | 52% | 80 | 5.0 |
| Comparative example 2 | Barium ferrite 1600 nm³ | 35 | 2.0 | 18800 | 0.2 | 12.9 | 65% | 100 | 5.0 |
| Comparative example 3 | Needle-shape metal 3000 nm³ | 70 | 2.0 | 3800 | 2 | 12.7 | 82% | 80 | 5.0 |
| Comparative example 4 | Barium ferrite 1600 nm³ | 70 | 2.0 | 8000 | 1.1 | 14.7 | 74% | 80 | 5.0 |

| | Second particle | | | | First particle/ second particle | SEM_ total | Thickness (μm) | |
|---|---|---|---|---|---|---|---|---|
| | SEM_ average area (nm²) | SEM_ quantity (counts/μm²) | AFM_ protrusion average height (nm) | Number of heights of 10 nm or more/ number of heights of 4 nm or more | protrusion height ratio | area (μm²/μm²) | Total thickness | Magnetic layer thickness |
| Example 1 | 3000 | 3 | 5.1 | 5.9% | 2.22 | 0.0119 | 5.63 | 0.08 |
| Example 2 | 4500 | 2.8 | 5.1 | 0% | 2.04 | 0.0072 | 5.68 | 0.08 |
| Example 3 | 3000 | 3.7 | 5.0 | 0% | 1.52 | 0.0158 | 5.58 | 0.08 |
| Example 4 | 5000 | 3.4 | 6.6 | 13.0% | 1.73 | 0.0101 | 5.52 | 0.07 |
| Example 5 | 2600 | 3.1 | 6.1 | 0.0% | 1.93 | 0.0113 | 5.62 | 0.08 |
| Comparative example 1 | 3800 | 2.8 | 5.2 | 7.7% | 2.35 | 0.0143 | 5.63 | 0.08 |
| Comparative example 2 | 6400 | 2.5 | 8.2 | 31.6% | 1.57 | 0.0028 | 5.71 | 0.06 |
| Comparative example 3 | 4300 | 1.7 | 6.2 | 3.2% | 2.05 | 0.0076 | 6.42 | 0.09 |
| Comparative example 4 | 4500 | 2.9 | 4.9 | 0.0% | 3.00 | 0.0088 | 5.69 | 0.08 |

| | Thickness (μm) | | | Magnetic layer P/B ratio | Friction rise inhibition (PES rise inhibition) | Abrasivity | |
|---|---|---|---|---|---|---|---|
| | Non-magnetic layer thickness | Base layer thickness | Back layer thickness | | | 100p | 200p |
| Example 1 | 1.05 | 4.00 | 0.50 | 7.0 | Excellent | 16.0 | 16.6 |
| Example 2 | 1.10 | 4.02 | 0.48 | 5.0 | Excellent | 17.0 | 16.0 |
| Example 3 | 1.02 | 4.00 | 0.48 | 7.0 | Excellent | 16.6 | 16.0 |
| Example 4 | 1.00 | 4.00 | 0.45 | 5.0 | Excellent | 18.5 | 18.0 |
| Example 5 | 1.07 | 3.98 | 0.49 | 7.0 | Excellent | 15.0 | 10.0 |
| Comparative example 1 | 1.05 | 4.00 | 0.50 | 5.0 | Defective | 18.0 | 14.9 |
| Comparative example 2 | 0.70 | 4.60 | 0.35 | 7.5 | Excellent | 21.0 | 17.0 |
| Comparative example 3 | 1.08 | 4.80 | 0.45 | 5.0 | Excellent | 26.4 | 24.1 |
| Comparative example 4 | 1.08 | 4.04 | 0.49 | 7.0 | Defective | 12.0 | 12.0 |

In Table 1, respective symbols represent the following measured values.

$t_T$: Average thickness (average total thickness) of magnetic tape (unit: μm)

$t_m$: Average thickness of magnetic layer (unit: nm)

$t_b$: Average thickness of back layer (unit: μm)

From the results represented in Table 1, the following can be understood.

In all the magnetic tapes according to Examples 1 to 5, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of the protrusions formed in accordance with the second particles is 7 nm or less, or a ratio ($H_1/H_2$) of an average height ($H_1$) of protrusions formed in accordance with the first particles to an average height ($H_2$) of protrusions formed in accordance with the second particles is 2.3 or less, and the average height ($H_1$) of the protrusions formed in accordance with the first particles is 12 nm or less, the standard deviation σPES of the PES value is 50 nm or less within 40 FV number, whereby an excellent friction rise inhibiting effect could be acquired. In addition, the abrasivity of the AlTiC rectangular prism is 12.5 or more and in the range of 20 or less, and a decrease in the polishing force of the magnetic tape according to running did not occur.

When Example 1 and Comparative example 1 are compared with each other, in the magnetic tape of Example 1, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of protrusions formed in accordance with the second particles is 7 nm or less, or the average height ($H_1$) of protrusions formed in accordance with the first particles is 12 nm or less, and the friction rise (PES rise) inhibiting effect was excellent. On the other hand, in the magnetic tape of Comparative example 1, a ratio ($H_1/H_2$) of an average height ($H_1$) of protrusions formed in accordance with the first particles to an average height ($H_2$) of protrusions formed in accordance with the second particles exceeds 2.3, and the average height ($H_1$) of protrusions formed in accordance with the first particles exceeds 12 nm, and thus the friction rise (PES rise) inhibiting effect was defective.

When Example 3 and Comparative example 2 are compared with each other, in the magnetic tape of Example 3, a ratio ($H_1/H_2$) of an average height ($H_1$) of protrusions formed in accordance with the first particles to an average height ($H_2$) of protrusions formed in accordance with the second particles is 2.3 or less, and the average height ($H_2$) of protrusions formed in accordance with the second particles is 7 nm or less, or the average height ($H_1$) of protrusions formed in accordance with the first particles is 12 nm or less, and the friction rise (PES rise) inhibiting effect was excellent, and the abrasivity of the AlTiC rectangular prism was appropriate. On the other hand, in the magnetic tape of Comparative example 2, the average height ($H_2$) of protrusions formed in accordance with the second particles exceeds 7 nm, and the average height ($H_1$) of protrusions formed in accordance with the first particles exceeds 12 nm, and the abrasivity of the AlTiC rectangular prism exceeds 20 in 100 passes, the polishing force was too high.

When Example 2 and Comparative example 3 are compared with each other, in the magnetic tape of Example 2, a ratio ($H_1/H_2$) of an average height ($H_1$) of protrusions formed in accordance with the first particles to an average height ($H_2$) of protrusions formed in accordance with the second particles is 2.3 or less, and the average height ($H_1$) of protrusions formed in accordance with the first particles is 12 nm or less, and the abrasivity of the AlTiC rectangular prism was appropriate. On the other hand, in the magnetic tape of Comparative example 3, the average height ($H_1$) of protrusions formed in accordance with the first particles exceeds 12 nm, and the abrasivity of the AlTiC rectangular prism exceeds 20 both in 100 passes and 200 passes, the polishing force was too high.

When Example 2 and Comparative example 4 are compared with each other, in the magnetic tape of Example 2, a ratio ($H_1/H_2$) of an average height ($H_1$) of protrusions formed in accordance with the first particles to an average height ($H_2$) of protrusions formed in accordance with the second particles is 2.3 or less, and the average height ($H_1$) of protrusions formed in accordance with the first particles is 12 nm or less, the friction rise (PES rise) inhibiting effect is excellent, and the abrasivity of the AlTiC rectangular prism was appropriate. On the other hand, in the magnetic tape of Comparative example 4, a ratio ($H_1/H_2$) of an average height ($H_1$) of protrusions formed in accordance with the first particles to an average height ($H_2$) of protrusions formed in accordance with the second particles exceeds 2.3, the average height ($H_1$) of protrusions formed in accordance with the first particles exceeds 12 nm, the friction rise (PES rise) inhibiting effect was defective, and the abrasivity of the AlTiC rectangular prism was less than 12.5 both in 100 passes and 200 passes, and the polishing force was too low.

Although the embodiment of the present technology and the examples have been described specifically, the present technology is not limited to the embodiment and the examples described above, and various modifications based on the technical idea of the present technology can be made.

For example, the configurations, the methods, the processes, the shapes, the materials, the numerical values, and the like exemplified in the embodiments and the examples described above are only examples, and as necessary, different configurations, methods, processes, shapes, materials, numerical values, and the like may be used.

Also, the configurations, methods, steps, shapes, materials, numerical values, and the like of the embodiments and the examples described above can be combined with each other without departing from the gist of the present technique.

In this specification, a numerical range represented using "to" represents a range including numerical values represented before and after "to" as a minimum value and a maximum value. In the numerical ranges described in a stepwise manner in this specification, an upper limit value or a lower limit value of a numerical range in any step may be replaced with an upper limit value or a lower limit value of a numerical range in another step. Unless otherwise specified, the materials described in this specification can be used alone or in combination of two or more.

REFERENCE SIGNS LIST

10 Magnetic recording medium
11 Base layer
12 Underlayer
13 Magnetic layer
14 Back layer

The invention claimed is:

1. A magnetic recording medium comprising a magnetic layer including magnetic powders, wherein the magnetic layer includes first particles having a conductivity and second particles of which Mohs hardness is 7 or more, wherein protrusions are formed on a surface of the magnetic layer side in accordance with the first particles and the second particles, wherein a ratio ($H_1/H_2$) of an average height ($H_1$) of protrusions formed in accordance with the first particles to an average height ($H_2$) of protrusions formed in accordance with the second particles is 2.3 or less, wherein the average height ($H_2$) of the protrusions formed in accordance with the second particles is 7 nm or less, wherein the average height ($H_1$) of the protrusions formed in accordance with the first particles is 12 nm or less, wherein the first particles include carbon particles, wherein the second particles include alumina particles, and wherein a number of the protrusions formed in accordance with the first particles on the surface of the magnetic layer side is 0.3 or more and 1.9 or less per unit area ($\mu m^2$).

2. The magnetic recording medium according to claim 1, wherein a shape of the magnetic powders is one of a plate shape, a sphere shape, and a square shape.

3. The magnetic recording medium according to claim 1, wherein a number of the protrusions formed in accordance with the second particles on the surface of the magnetic layer side is two or more per unit area ($\mu m^2$).

4. The magnetic recording medium according to claim 1, wherein a ratio of the second particles forming protrusions having protrusion heights of 10 nm or more to the second particles forming protrusions having protrusion heights of 4 nm or more on the surface of the magnetic layer side is 20% or less.

5. The magnetic recording medium according to claim 1, wherein a ratio of the first particles forming protrusions having protrusion heights of 10 nm or more to the first particles forming protrusions having protrusion heights of 4 nm or more on the surface of the magnetic layer side is 60% or less.

6. The magnetic recording medium according to claim 1, wherein an average thickness of the magnetic recording medium is 5.7 µm or less.

7. The magnetic recording medium according to claim 1, wherein an average thickness of the magnetic layer is 0.08 µm or less.

8. The magnetic recording medium according to claim 1, wherein abrasivity of an AlTiC rectangular prism corresponding to 100 passes and measured in compliance with ECMA-319 Annex C satisfies a following relational expression:

$$12.5 \leq Abrasivity \leq 20.$$

9. A magnetic recording cartridge in which the magnetic recording medium according to claim 1 is wound around a reel.

* * * * *